US012761015B2

(12) United States Patent
Munro

(10) Patent No.: US 12,761,015 B2
(45) Date of Patent: Oct. 13, 2026

(54) SURFACE METROLOGY SYSTEMS AND METHODS THEREOF

(71) Applicant: OptiPro Systems, LLC, Ontario, NY (US)

(72) Inventor: James Fredric Munro, Ontario, NY (US)

(73) Assignee: OptiPro Systems, LLC, Ontario, NY (US)

( * ) Notice: Subject to any disclaimer, the term of this patent is extended or adjusted under 35 U.S.C. 154(b) by 117 days.

(21) Appl. No.: 18/799,510

(22) Filed: Aug. 9, 2024

(65) Prior Publication Data

US 2024/0401938 A1 Dec. 5, 2024

Related U.S. Application Data

(63) Continuation of application No. 17/400,862, filed on Aug. 12, 2021, now Pat. No. 12,123,701.

(60) Provisional application No. 63/065,316, filed on Aug. 13, 2020.

(51) Int. Cl.

| | |
|---|---|
| ***G01B 11/24*** | (2006.01) |
| ***G01B 9/02*** | (2022.01) |
| ***G01B 11/245*** | (2006.01) |
| ***G01M 11/02*** | (2006.01) |

(52) U.S. Cl.

CPC ........ *G01B 11/2441* (2013.01); *G01B 9/0205* (2013.01); *G01B 11/245* (2013.01); *G01M 11/0271* (2013.01)

(58) Field of Classification Search

CPC .............. G01B 9/0205; G01B 11/2441; G01B 11/245; G01M 11/0271

See application file for complete search history.

(56) References Cited

U.S. PATENT DOCUMENTS

| | | | | |
|---|---|---|---|---|
| 12,123,701 | B2 * | 10/2024 | Munro | G01B 11/005 |
| 2014/0368830 | A1 * | 12/2014 | Michelt | G01B 11/0608 356/485 |
| 2017/0082521 | A1 * | 3/2017 | May | G01M 11/0214 |
| 2017/0089683 | A1 * | 3/2017 | Yokoyama | G01B 5/008 |
| 2017/0261304 | A1 * | 9/2017 | Vogt | G01B 7/003 |
| 2020/0003544 | A1 * | 1/2020 | Nahum | G01B 5/0004 |

(Continued)

FOREIGN PATENT DOCUMENTS

| | | | | |
|---|---|---|---|---|
| JP | 2011526735 A | * 10/2011 | | G01B 9/02028 |

*Primary Examiner* — Michael A Lyons

(74) *Attorney, Agent, or Firm* — Troutman Pepper Locke LLP

(57) ABSTRACT

A system for measuring the topography of a surface including a carriage assembly and a base assembly. The carriage assembly comprising a plurality of displacement-measuring probes coupled to a carriage support structure. The base assembly positioned adjacent to the carriage assembly and comprising at least one reference object with an opening sized to receive a test object. At least one of the carriage assembly or the base assembly is configured to translate with respect to the other in at least two directions to enable at least one of the displacement-measuring probes to measure a displacement to a reference surface of the reference object and at least another one of the displacement-measuring probes to measure a displacement to a target surface of the target object whose topography is measured.

16 Claims, 16 Drawing Sheets

(56) References Cited

U.S. PATENT DOCUMENTS

| | | | | |
|---|---|---|---|---|
| 2021/0285096 | A1* | 9/2021 | Shinada | C23C 14/547 |
| 2022/0137517 | A1* | 5/2022 | Jansen | G03F 7/70775<br>355/72 |

* cited by examiner

Figure 3A
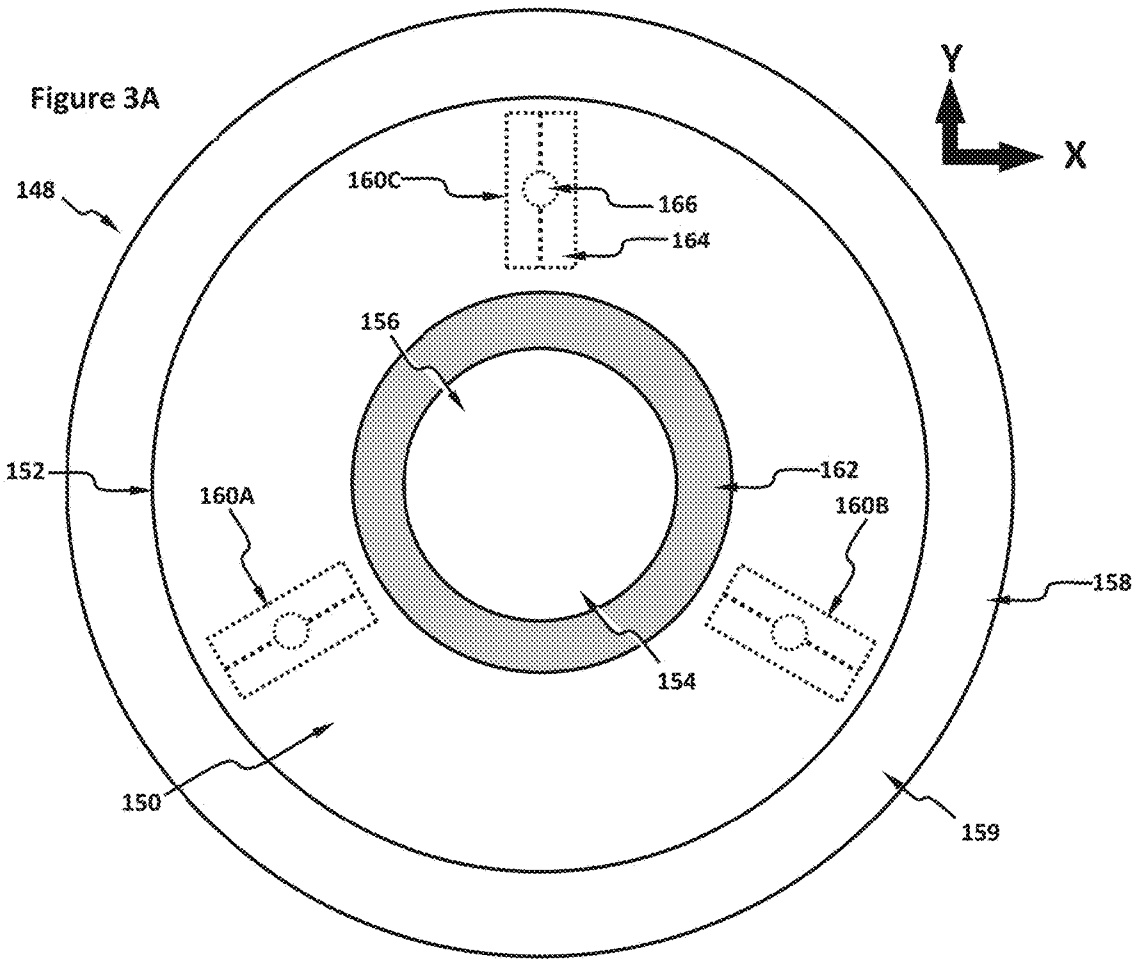
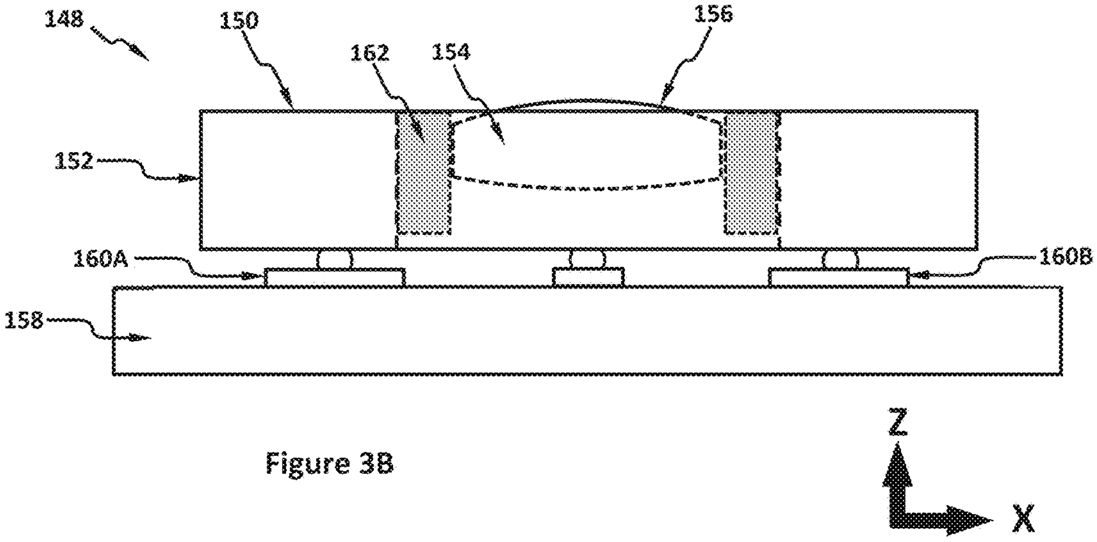
Figure 3B

Figure 4A
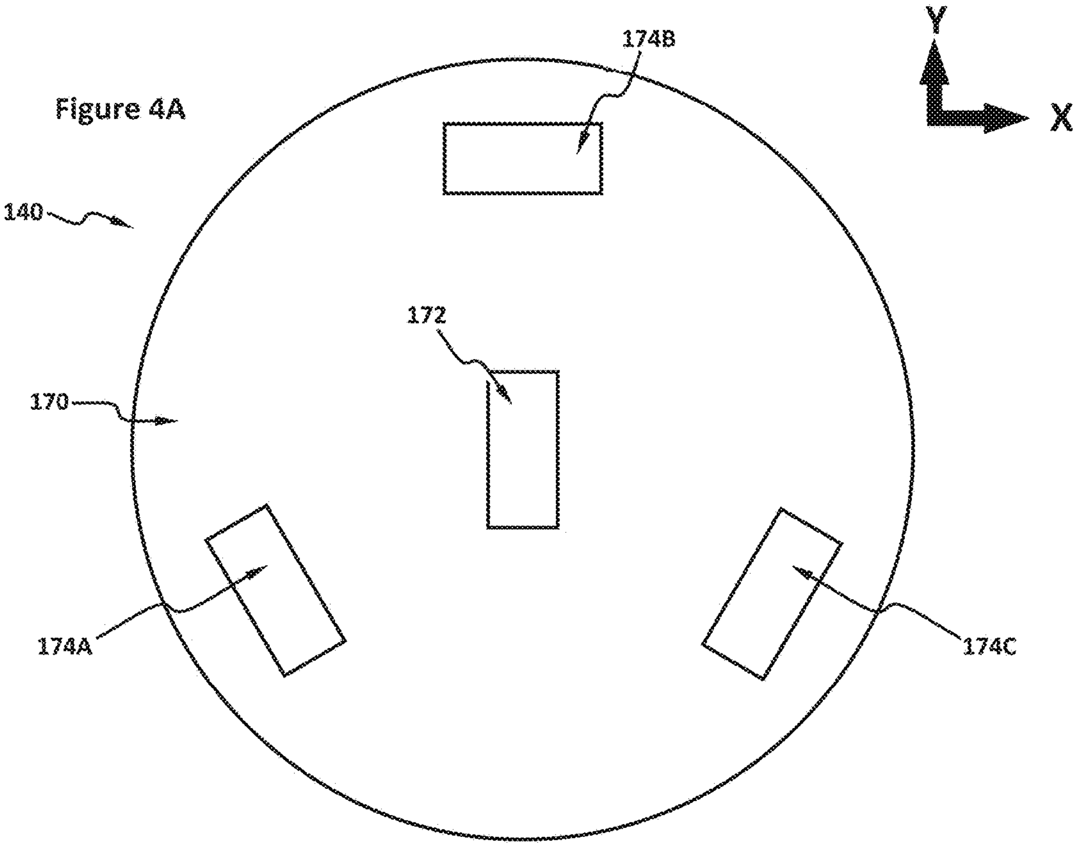
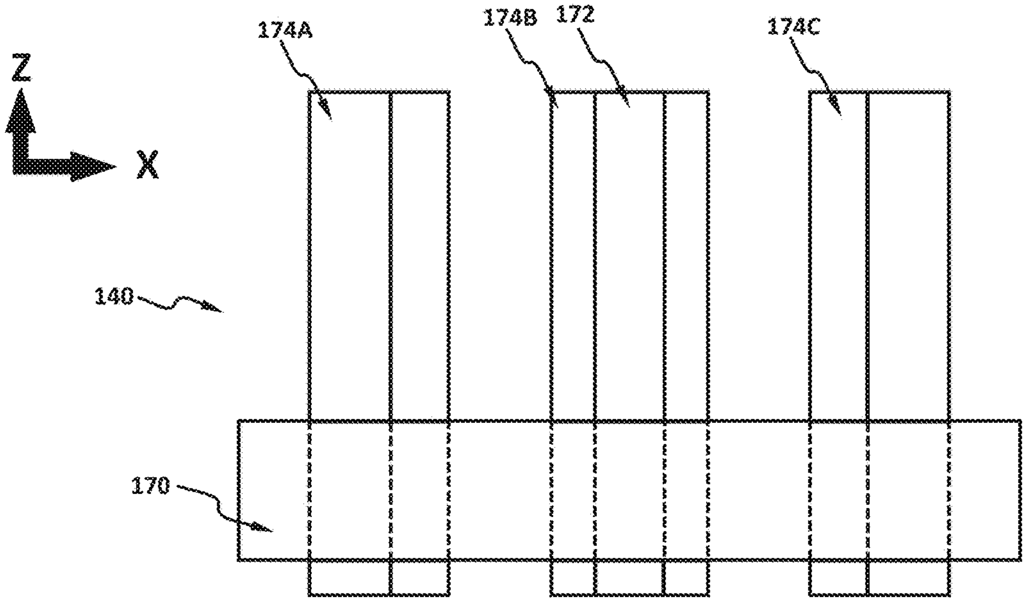
Figure 4B

SURFACE METROLOGY SYSTEMS AND METHODS THEREOF

This application is a continuation of U.S. patent application Ser. No. 17/400,862, filed Aug. 12, 2021, and claims the benefit of U.S. Provisional Patent Application Ser. No. 63/065,316, filed Aug. 13, 2020, both of which are hereby incorporated by reference in their entirety.

FIELD

The technology generally relates to systems and methods for measuring the surface topography of an article of manufacture, and, more particularly, for the non-contact measurement of the surface of an optical element with a referenced scanning optical probe.

BACKGROUND

Aerial surface interferometry, including aerial phase-measuring interferometry, has been used to measure the shape or form of optical surfaces for several decades. While generally quite fast and accurate, prior aerial surface interferometry suffers from errors—such as retrace errors—and also introduces unexpected costs and complexities in the surface metrology process.

For example, aerial interferometers often depend on test spheres and null correctors, and an error in their fabrication can result in later errors in the surface topography measurement results. Indeed, the infamous surface errors in the primary mirror of the Hubble Space Telescope have been traced to problems with a null corrector. Since that time NASA—and manufacturers of optics in general—have been seeking non-aerial yet non-contact approaches for high-precision surface metrology. Generally, these approaches entail the use of an optical probe that measures displacement of a surface at a given location, and the probe is then scanned across the surface of interest to generate a complete topographic map of the surface. The scanning process generally occurs with a coordinate measurement machine (CMM) in which the location of the probe in all three axes relative to the location of the test piece is known, albeit relatively imprecisely.

One such prior art CMM is the coordinate measurement machine 10 as shown FIG. 1. As seen in FIG. 1, a displacement measurement probe 28 is mounted onto a vertical stage 26 that in turn is mounted onto bridge 12 which in turn is mounted onto left bridge leg 14 and right bridge leg 16. Left bridge leg 14 rests on left rail 18 which in turn is mounted onto base 22. Similarly, right bridge leg 16 rests on right rail 20 which is also mounted onto base 22. Base 22 rests atop three or more legs 24. Also, probe 28 has a probing element 32, which can be a rigid mechanical device if the CMM 10 operates in a contact method or an optical emission if the CMM 10 operates in a non-contact mode. The displacement of the surface under test of a test object 34 from the probe 28 to a location of the surface under test 30 directly beneath probe 28 is determined by analyzing signals generated by the probing element 32 and associated hardware.

In operation, probe 28 of CMM 10 must be scanned in the X and Y directions, while maintaining a known Z location above and with respect to test object 34, so a precise aerial topographic map of surface under test 30 can be determined. The vertical stage 26 is used to position the probe 28 at a nominal location (in Z) above the surface under test 30. The vertical stage 26—to which probe 28 is coupled—translates in the X-direction by virtue of a translation stage in the bridge 12. Finally, translation mechanisms associated with left rail 18 and right rail 20 effect a motion in the Y-direction of the bridge 12, vertical stage 26, probe 28, and probing element 32. In this way probe 28 and its probing element 32 can be positioned in nearly any (X,Y,Z) location to advantageously scan probing element 32 across surface under test 30 in a known and precise manner.

However, CMM 10 has limitations that limit its measurement accuracy of a surface under test 30 to about 100 nanometers (100 nm). For example, even though CMM 10 is located in a temperature controlled and stabilized room, small changes in ambient temperature, such as 0.1° C., occurring over the course of an aerial measurement of surface under test 30, can cause the length (in X) of bridge 12 to change by virtue of their non-zero CTE such that the actual measurement location of probing element 32 on surface under test 30 is not where it is believed to be, resulting in a different location being measured on surface under test 30 that has a different surface displacement resulting in an error in the Z-elevation measurement. Likewise, a change in ambient temperature can cause the vertical length of right and left bridge legs (16 and 14, respectively) to change by virtue of their non-zero CTE and cause unknown and uncorrectable errors in the measurement of displacement of surface under test 30 by probe 28.

SUMMARY

A system for measuring the topography of a surface including a carriage assembly and a base assembly. The carriage assembly comprising a plurality of displacement-measuring probes coupled to a carriage support structure. The base assembly positioned adjacent to the carriage assembly and comprising at least one reference object with an opening sized to receive a test object. At least one of the carriage assembly or the base assembly is configured to translate with respect to the other in at least two directions to enable at least one of the displacement-measuring probes to measure a displacement to a reference surface of the reference object and at least another one of the displacement-measuring probes to measure a displacement to a target surface of the target object whose topography is measured.

A method for making a surface topography measurement system includes coupling a plurality of displacement-measuring probes to a carriage support structure to generate a carriage assembly. A base assembly positioned adjacent to the carriage assembly and comprising a reference object with an opening sized to receive a test object. At least one of the carriage assembly or the base assembly is configured to translate with respect to the other in at least two directions to enable at least one of the displacement-measuring probes to measure a displacement to a reference surface of the reference object and at least another one of the displacement-measuring probes to measure a displacement to a target surface of the target object whose topography is measured.

A surface metrology system for measuring the topography of a surface comprises a scanning carriage assembly having at least one measurement probe and at least one reference probe in which the measurement probe is located proximal to and measures the displacement of a surface under test and in which the reference probe is located proximal to and concurrently measures the displacement to a reference surface. The surface under test is rigidly clamped or otherwise coupled to the reference surface during the surface measurement process. The use of zero- or near-zero-CTE materials in the reference and carriage assemblies ensures the coordinate framework of the surface metrology system is invariant with changes in ambient temperature during the measurement process. The resulting surface metrology system can produce topographical maps of an unknown surface with accuracies better than one (1) nanometer.

Accordingly, examples of the claimed technology provide a number of advantages including providing a surface metrology system that employs a scanning displacement-measuring probe in an opto-mechanical configuration that has little or no measurement errors resulting from changes in ambient temperature or other environmental conditions.

BRIEF DESCRIPTION OF THE DRAWINGS

FIG. 3A is a plan view of a base assembly of the surface metrology system in accordance with examples of this technology;

FIG. 3B is a side view of a base assembly of the surface metrology system in accordance with examples of this technology;

FIG. 4A is a plan view of a carriage assembly of the surface metrology system in accordance with examples of this technology;

FIG. 4B is a side view of a carriage assembly of the surface metrology system in accordance with examples of this technology;

DETAILED DESCRIPTION

Figure 1:
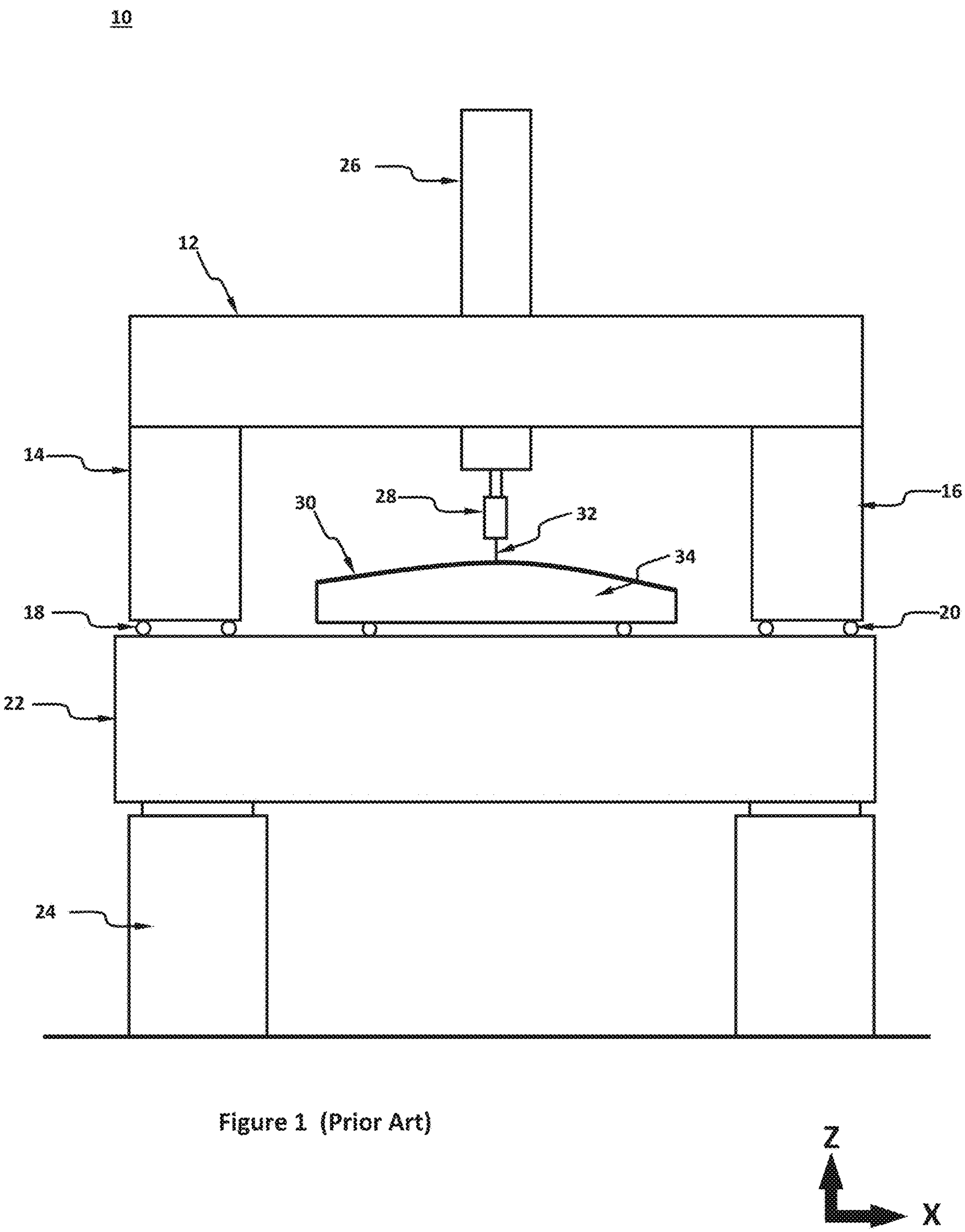
Figure 1 (Prior Art)
FIG. 1 is a block diagram of a prior art coordinate measurement system.

A surface metrology system 50 in accordance with examples of the claimed technology is illustrated in FIGS. 5-12. The surface metrology system 50 includes a carriage assembly 140 and a base assembly 148 with one or more reference probes 174A, 174B, and 174C and one or more test probes 172 coupled to carriage assembly 140, although the system could have other types and/or numbers of other systems, devices, components and/or other elements in other configurations. The test probe 172 and reference probes 174A, 174B, and 174C all measure displacement from a measurement point on a test surface or reference surface respectively, and can be contact, or, advantageously in this example non-contact. Additionally, other numbers of test probes and/or reference probes may be used. An example of a non-contact displacement-measuring probe suitable for use as a test or reference probe in this example of the technology is illustrated in FIG. 2, although other types of displacement-measuring probes can be used.

Figure 2:
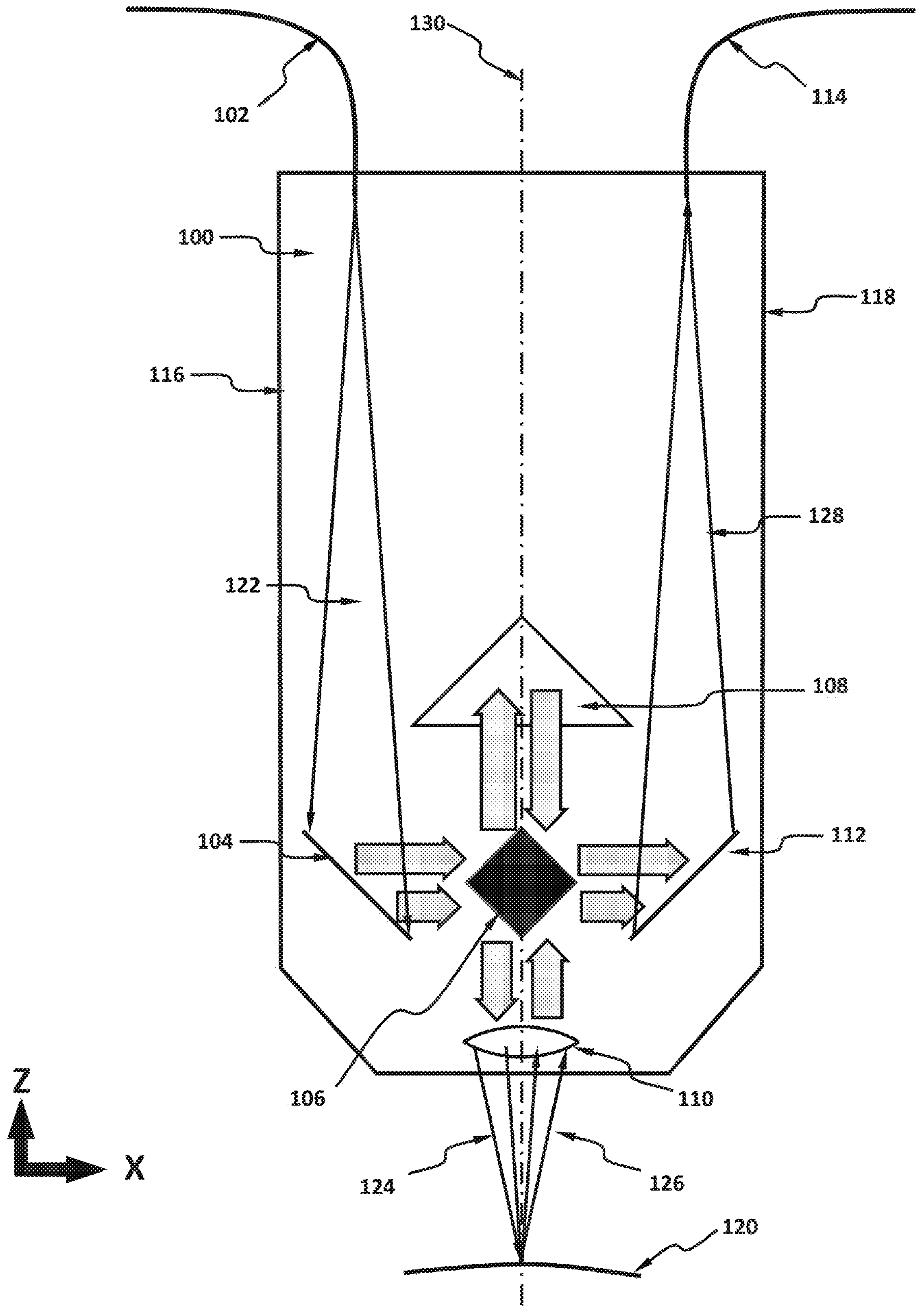
FIG. 2 is a diagram of a spectral interferometric probe for displacement measurement.

In the chromatic interferometric probe 100 illustrated in FIG. 2, a white light laser (not shown) generates broadband coherent light and outputs it through source fiber 102 whereupon the broadband coherent light enters chromatic interferometric probe 100 through a port in probe body 116 and becomes diverging source light 122, and, together with source right angle parabolic mirror (source RAPM) 104, forms the source arm of an interferometer. Diverging source light 122 is incident on source RAPM 104 and reflects from source RAPM 104 in a manner such that the reflected light is substantially collimated.

Collimated light reflected from source RAPM 104 is then incident on the two input facets of a mirrored beamsplitter 106, which then reflects half of the collimated light upwards towards right angle prism 108 and the other half downwards chromatic lens 110. Chromatic lens 110 then spectrally disperses the broadband collimated light while focusing it chromatically along optical axis 130 as converging chromatic measurement light 124. A surface under test 120 placed in the focal range of converging chromatic measurement light 124 along optical axis 130 causes a portion of the converging chromatic measurement light 124 to be reflected as reflected chromatic measurement light 126. Reflected chromatic measurement light 126 then enters chromatic lens 110 which re-collimates the reflected chromatic measurement light 126 and causes it to be directed to a first output facet of beamsplitter 106 which then reflects the collimated chromatic measurement light towards output RAPM 112. Note that chromatic lens 110 and surface under test 120 form the measurement arm of an interferometer.

Collimated light reflected from source RAPM 104 that is incident on the upper of the two input facets of mirrored beamsplitter 106 is reflected by beamsplitter 106 upwards (in a direction substantially parallel to optical axis 130) towards right angle prism 108, whereupon it enters the hypotenuse of right angle prism 108, totally internally reflects (TIR's) from a first short side of right angle prism 108, then from a second short side of right angle prism, and exits from right angle prism 108 through its hypotenuse in a direction again substantially parallel to optical axis 130 and is directed to a second output facet of beamsplitter 106 which then reflects the collimated doubly-TIR'ed light from reference prism 108 towards output RAPM 112. Note that right angle prism 108 forms the reference arm of an interferometer.

Collimated light beams reflected from the two output facets of beamsplitter 106 are incident on output RAPM 112 which reflects the beams into converging output light 128 which comes to a focus on the input aperture of output fiber 114. Note that the light that enters output fiber 114 contains broadband reference light from the reference arm of the interferometer as well as a narrow spectral band of light from the converging chromatic light 124 that was in-focus at the surface under test 120 of the measurement arm of the interferometer. The measurement light and the reference light are then transmitted though output fiber 114 to a spectrometer (not shown) wherein the reference and measurement light are made to interfere on the output element of the spectrometer which is generally an image sensor. The resulting spectral interferogram is then captured by the image sensor and converted to an electronic format which is then output to a downstream digital processor (not shown). The digital processor then processes the electronic representation of the spectral interferogram and determines the central wavelength of the interferogram with great precision. By a priori knowledge of the relationship between the displacement being measured and central wavelength gained through a previously-executed calibration algorithm, the digital processor converts the determined central wavelength to a displacement, which is known with great precision.

Chromatic interferometric probe 100 provides a number of beneficial characteristics over other displacement-measuring probes including high accuracy and repeatability, often of less than one nanometer, high measurement rate, often more than 1000 displacement measurements per second, and the ability to measure displacement of uncooperative surfaces, by virtue of the "interferometric gain" term, such as surfaces that are absorptive or highly angled. All of these beneficial characteristics of this probe 100, whether being used as a test probe 172 and/or a reference probe 174, as discussed below, can be advantageously utilized in the surface metrology system 50.

Another assemblage of the surface metrology system 50 is the base assembly 148. As illustrated in FIG. 3A-3B, base assembly 148 can comprise a base structure 158, three Kelvin clamps, 160A, 160B, and 160C, a reference object 152 having a reference surface 150, a test object 154 having a test surface 156, and a test object clamp 162 that prevents the test object 154 from moving relative to the reference object 152 while test surface 156 is being measured.

The base structure 158 of base assembly 148 supports the positioning—either directly or indirectly—of the test and reference objects 154 and 152 respectively of surface metrology system 50. Base structure 158 is rigid and has considerable mass, in this example at least 10 kg and more advantageously more than 50 kg, to minimize the effects of external vibrations and changes in temperature on the measurement process. Base structure 158 can be fabricated of granite, or a material having a low coefficient of thermal expansion, such as invar, Zerodur®, or ULE® from Corning, Inc. (Corning, NY, USA). In this example, this low coefficient of thermal expansion is less than 1.5e−6 mm/mm/degC (which captures all low-CTE materials including invar) and advantageously less than 0.1e−6 mm/mm/degC (which applies to ULE® and Zerodur®).

Base structure 158 has an upper base surface 159 on which are mounted three Kelvin clamps 160A, 160B, and 160C. Upper base surface 159 is ideally flat, having a maximum peak-to-valley distance under the areas occupied by the reference object 152 and carriage assembly 140 of less than 0.1 mm, or advantageously in this example less than 0.01 mm.

Continuing with reference to FIGS. 3A and 3B, it is seen that three Kelvin clamps, 160A, 160B, and 160C, utilize Maxwell coupling to kinematically position reference object 152 above and with respect to base structure 158. Each Kelvin clamp 160 comprises a V-groove 164 and a spherical ball 166, wherein the V-grooves 164 can be machined into upper base surface 159 or are V-blocks affixed to upper base surface 159, and are oriented such that the direction of the V's intersect at a point and whose intersecting lines are separated by 120° of arc. Spherical balls 166 are affixed to the underside of reference object 152, and are positioned to engage with the grooves of V-grooves 164. As such, by virtue of the kinematic relationship provided by the three Kelvin clamps, the position of reference object 152 with respect to base structure 158 will not vary, or vary by only a few microns, with substantial changes in ambient temperature.

The reference object 152 is located kinematically above base structure 158 as discussed above. Reference object 152 has an upper reference surface 150 that is substantially planar and is used as a comparison plane that surface displacements of test surface 156 are referenced to when the surface topography of test surface 156 is measured by surface metrology system 50. To facilitate the surface measurement process, reference object 152, and more particularly reference surface 150, can substantially surround test object 154. If test object 154 is round in shape (i.e., has a circular perimeter), such as a lens as depicted in FIG. 3A, then reference object 152 can be ring-shaped, with the width of the ring annulus being equal to or greater than the diameter test object 154. Other reference object shapes and reference surface shapes are discussed in connection with FIGS. 12 and 13. Reference object 152 can be fabricated from a low-CTE material, such as invar, Zerodur®, or ULE®, and in this example, is advantageously composed of the same material the base structure 158 is composed of so their CTE's match. Additionally, in this example, this low coefficient of thermal expansion is less than 1.5e−6 mm/mm/degC (which captures all low-CTE materials including invar) and advantageously less than 0.1e−6 mm/mm/degC (which applies to ULE® and Zerodur®). Reference surface 150 is a polished and substantially planar surface with minimal surface deviations from a plane; peak-to-valley planar deviations across the usable portion of the reference surface 150 are advantageously in this example less than 0.01 μm. Also, the surface topography of reference surface 150 can be measured with conventional aerial interferometry (since it is planar many interferometer error—such as retrace errors—can be minimized and made negligible), and the known topographical map of reference surface 150 can be mathematically processed such that the effects of the unflatness of reference surface 150 are removed from the measured surface topography of test surface 156. Additionally, a plurality of reference objects having reference surfaces can be employed instead of a unitary reference object 152, in which for example, there is one reference surface for each reference probe 174A, 174B, and 174C, although other numbers and configurations of reference surfaces are possible as well. The plurality of reference surfaces can be substantially co-planar or not co-planar in which case the vertical offset difference and tilt difference between them will cause the measured topography of the test surface 156 to have a tilt component as well. This tilt component in the measured topography of test surface 156 can be removed mathematically, if desired, by finding the best-fit tilt with a regression algorithm and then arithmetically subtracting the tilt from the measured topology of test surface 156.

With continued reference to FIGS. 3A and 3B, it is seen that test object 154 having test surface 156 is centrally positioned within reference object 152. Test surface 156 is that surface whose topography is to be measured with surface metrology system 50. Test object 154 can be an optical article of manufacture, such as a mirror or lens, or non-optical such as a gear or turbine blade. Test object 154 can be circular in shape, but can also be non-circular such as rectangular, piecewise-linear, arcuate, or polygonal. Test surface 156 can have rotational symmetry and be spherical or aspherical, or can have left-right symmetry such as cylindrical or acylindrical surfaces, or can have a so-called free-form surface profile. Test object 154 can for example be composed of a glass material, such as fused silica, Zerodur®, or ULE®, or a metal material such as invar, steel, or aluminum, or even silicon or silicon carbide. Test surface 156 can be absorptive or non-absorbing, or reflective, and can also be coated with a metallic coating, a dielectric coating, or a stack of thin film dielectric coatings, or even left uncoated. In this example, a width of test object 154 can be between 1 mm and 10 meters; the peak-to-valley height of test surface 156 over its clear aperture can be between 1 picometer (i.e., nearly planar) to greater than 1.0 meter, although objects and surfaces with other dimensions can be measured as well. The test surface 156 can be smooth and free of discontinuities or other abrupt changes in elevation, or it can have discontinuities, either of which can be readily measured by examples of the claimed technology.

In order for the reference surface 150 to be effective, the position of the test surface 156 must be held constant with respect to the position of the reference surface 150 during the process of measuring the topography of test surface 156. One advantageous way to effect this constant surface positioning relationship is to simply maintain the position of test object 154 constant with respect to the position of reference object 152 during the process of measuring the topography of test surface 156, which can be maintained by clamping test object 154 to reference object 152 during the measurement process. To this end, test object clamp 162 is provided in base assembly 148. When test object clamp 162 is deactivated test object 154 can be installed by a user in surface metrology system 50 as shown in its measurement position in FIG. 3B. When test object clamp 162 is activated test object 154 is locked in position with respect to reference object 152. Later, when the surface metrology process is complete test object clamp 162 can be deactivated and the user can remove the test object 154 from the surface metrology system 50. Test object clamp 162 must utilize a clean and dry clamping process so no residue from the clamping process is left on any surface of test object 154. Further, test object clamp 162 must utilize a clamping process that does not impart stresses on test object 154 and thereby cause test surface 156 to deform during the surface metrology process. Test object clamp 162 can, for example, utilize vacuum-based grippers or chucks, fluid-filled (including ferroelectric fluids) pressurized bladders, mechanical fingers or chucks, gripping mechanisms that utilize Van der Waals forces, or even a clamping mechanism that utilizes the phase transition of granular materials such as those offered by Empire Robotics (Boston, MA, USA). Test object clamp 162 is also electrically activated in this example, either directly or indirectly, to facilitate the clamping process and for subsequent ease of use by the user. Alternately, in lieu of a clamping mechanism to couple the test object 154 to reference object 152, test object 154 can be mounted atop kinematic Kelvin clamps similar to that described in connection with FIG. 3A, such that that test object 154 is substantially stationary with respect to reference object 152 during the surface measurement process.

Another assemblage of the surface metrology system 50 is the carriage structure of the carriage assembly 140. As illustrated in FIGS. 4A and 4B, the carriage structure of the carriage assembly 140 can comprise the carriage stage 170, the carriage legs 184A and 184B, and the carriage bearings 182A and 182, although the carriage assembly 140 could have other types and/or numbers of other components and/or other elements in other configurations In this example, the carriage stage 170 is coupled to and provides the support for the central test probe 172, and at least one, but in this example advantageously at least three reference probes, such as reference probe 174A, reference probe 174B, and reference probe 174C, although again other types and/or numbers of other probes in other configurations may be used. The central test probe 172 can be, for example, potted, bonded, or otherwise mechanically attached to carriage stage 170 to prevent a movement of test probe 172 with respect to carriage stage 170. Similarly, the one or more reference probes 174A, 174B, and 174C, can also be, for example, potted, bonded, or otherwise mechanically attached to carriage stage 170 to prevent a movement of each of the reference probes 174A, 174B, and 174C with respect to carriage stage 170. The optical (measurement) axis of all of the probes (i.e., test probe 172 and reference probes 174A, 174B, and 174C) must be substantially parallel to one another, and, furthermore, must be substantially perpendicular to reference surface 150 within surface metrology system 50. In particular, if chromatic interferometric probe 100 is used for the test probe 172 and also for each of the reference probes 174A, 174B, and 174C, then optical axis 130 of each of these probes must be substantially parallel to one another after the chromatic interferometric probes 100 are installed as test and reference probes on carriage stage 170.

With continued reference to FIGS. 4A and 4B, carriage assembly 140 also has the carriage stage 170, the carriage legs 184A and 184B, and the carriage bearings 182A and 182B, although the carriage assembly 140 again could have other types and/or numbers of other components and/or other elements in other configurations. The carriage stage 170 has flat upper and lower surfaces, with a circular perimeter, although other shapes, such as rectangular or hexagonal by way of example are possible as well. A distance between upper and lower surfaces (i.e., the thickness) of carriage stage 170 can be between 1 mm and 500 mm, and a width (being the outer diameter if carriage stage 170 is circular) of carriage stage 170 can be between 50 mm and 5 meters. Furthermore, an aspect ratio, being the ratio of width to thickness, of carriage stage 170 can be between 1.0 and 100.0, with smaller aspect ratios being advantageous as they lead to stiffer carriages 170 that do not deflect or change shape with changes in temperature or loading. Carriage stage 170 must be rigid and can be fabricated from a low-CTE material, such as invar, Zerodur®, or ULE®, and in this example, is advantageously composed of the same material the base structure 158 is composed of so their CTE's, and other mechanical properties, match. In this example, this low coefficient of thermal expansion is less than 1.5e−6 mm/mm/degC (which captures all low-CTE materials including invar) and advantageously less than 0.1e−6 mm/mm/degC (which applies to ULE® and Zerodur®).

Test probe 172 is detachably secured to and located at or near the center carriage stage 170, above test surface 156, although other locations of test probe 172 are possible as well. The purpose of test probe 172 is to measure the displacement to the test surface 156 of test object 154. This displacement measurement by test probe 172 of test surface 156 occurs for several measurement locations on test surface 156 so a displacement map of test surface 156 can be constructed from which a topographic map of test surface 156 can be determined. To obtain the several measurement locations on test surface 156 the test probe 172 must be translationally scanned over test surface 156 which can be caused to happen by translationally scanning carriage assembly 140—and the probes 172 and 174A, 174B, and 174C coupled thereto in this example—as will be discussed later in connection to FIGS. 5-7. Test probe 172 can be a chromatic interferometric probe 100 as described previously, or any other displacement-measuring probe such as a chromatic probe, a low-coherence (quasi-monochromatic) probe such as those produced by Lumetrics, Inc. (Rochester, NY, USA), or a Fourier-Domain spectral probe such as those often employed in optical coherence microscopy applications. Test probe 172 often has a standoff distance, defined as the distance from the probe to a working distance along its optical or measurement axis in which the probe cannot measure displacement, and a working distance through which the probe is capable of measuring displacement. The standoff distance of test probe 172 can be between 1 mm and 100 mm, advantageously in this example on the order of 10 mm, and the working distance can be between 0.1 mm and 15 mm, the working distance being advantageously in this example 1 mm or less for high-accuracy surface measurement applications, and advantageously in this example greater than 1 mm in those situations where the sag (i.e., the peak-to-valley distance of test surface 156) is large. Test probe 172 advantageously in this example can determine several hundred displacements of test surface 156 per second, ideally up to 10,000 per second, although 1,000 measurements/second is typical. The measurement spot size of test probe 172 is as small as possible, having a width of less than 10 μm, or advantageously in this example less than 1 μm.

Figure 5:
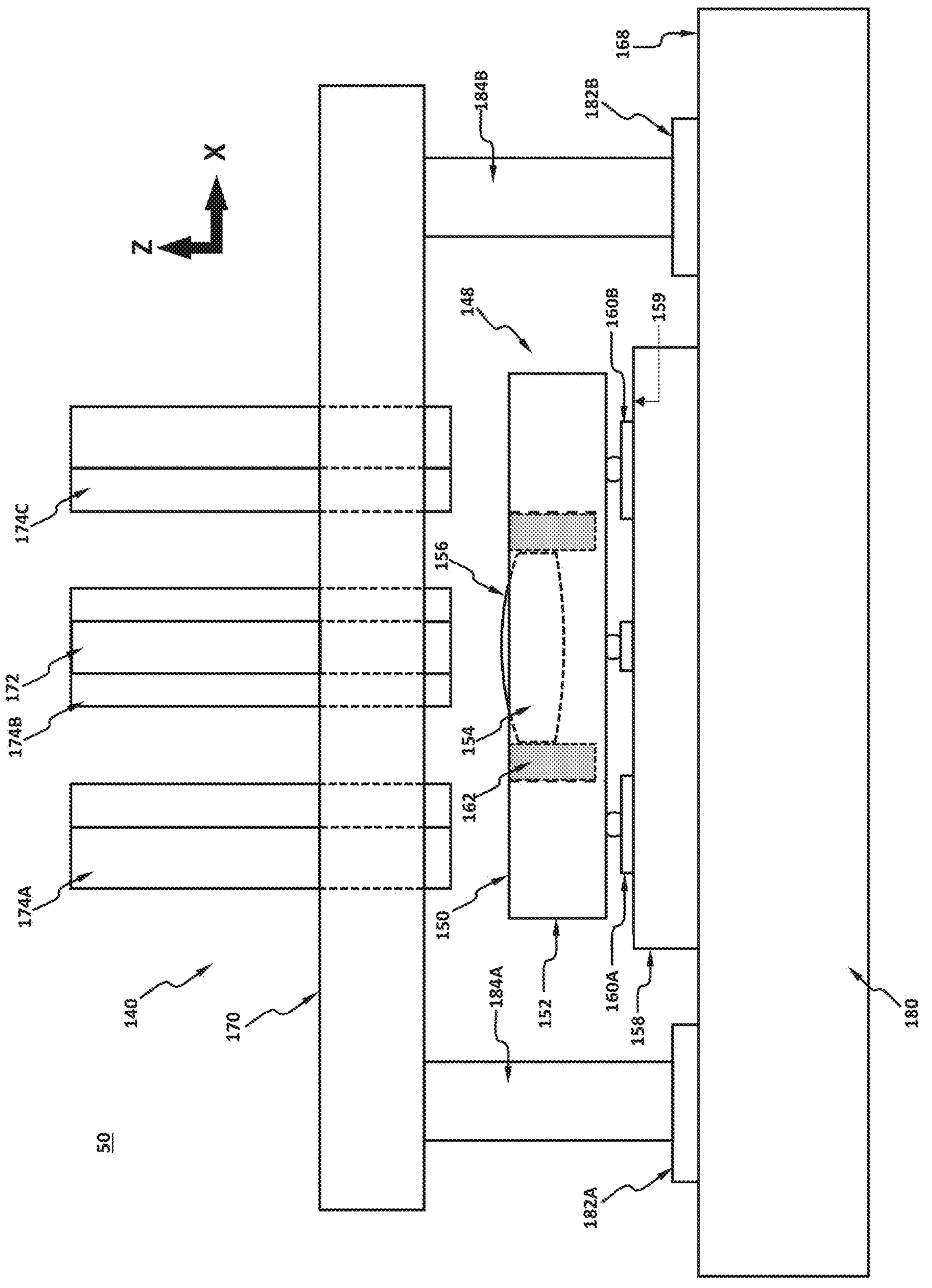
FIG. 5 is a side view of the surface metrology system in accordance with examples of this technology.

Reference probes 174A, 174B, and 174C (collectively hereafter referred to as reference probes 174) are located at equally spaced intervals (i.e., 120° of arc) along a radius of carriage 140, above reference surface 150, although other locations of reference probes 174 are possible as well. The purpose of reference probes 172 is to measure the displacement to reference surface 150 of reference object 152 as seen in FIG. 5 during the process of measuring the topography of test surface 156. Since in this example there are nominally at least three reference probes 174A, 174B, and 174C, a reference plane can be determined from knowledge of the reference displacements, from which the displacement to test surface 156 can be accurately determined. The displacement measurements by reference probes 174 of reference surface 150 occurs for several measurement locations on test surface 156 so a displacement map of test surface 156 can be constructed from which a topographic map of test surface 156 can be determined. To obtain the several measurement locations on test surface 156 the reference probes 174 must be translationally scanned—concurrent with test probe 172 scanning over test surface 156—over reference surface 150 which can be caused to happen by translationally scanning carriage 140—and the probes coupled thereto. Reference probes 174 can be a chromatic interferometric probe 100 as described previously, or any other displacement-measuring probe, such as a chromatic probe, a low-coherence (quasi-monochromatic) probe such as those produced by Lumetrics, Inc. (Rochester, NY, USA), or a Fourier-Domain spectral probe such as those often employed in optical coherence microscopy applications. Reference probes 174A, 174B, and 174C have a standoff distance, defined as the distance from the reference probe to a working distance along its optical or measurement axis in which the probe cannot measure displacement, and a working distance through which the probe is capable of measuring displacement. The standoff distance of reference probe 174A, 174B, or 174C can be between 1 mm and 100 mm, advantageously in this example on the order of 5 mm, and the working distance can be between 0.1 mm and 5 mm, the working distance being advantageously in this example 1 mm or less since high accuracy is desired for reference measurements and because the peak-to-valley measurement distance of reference surface 150 is small—being a few tens of nanometers at most. Reference probes 174A, 174B, and 174C can determine several hundred displacements of reference surface 150 per second, ideally up to 10,000 per second, and occur in temporal synch with the displacement measurements of test probe 172. The measurement spot size of reference probes 174A, 174B, and 174C advantageously in this example have a diameter of less than 10 μm.

As seen in FIG. 5, carriage leg 184A and carriage leg 184B are shown attached to the underside of carriage stage 170, although other numbers—such as three, four, or six, or even zero as described later in connection with FIG. 15—of carriage legs, and orientations and configurations under the carriage stage 170 are possible as well. The lower end of each carriage leg 184A, 184B, etc., is coupled to a bearing 182A, 182B, etc., respectively, and the lower surface of each bearing 182A and 182B rests atop a platform 180. Bearing 182A and 182B slide across the upper platform surface 168 of platform 180 as the carriage assembly 140 translates in the X and Y directions during a measurement of test surface 156. Bearings 182A and 182B can be air-bearings such that the interface between bearing 182A and bearing 182B and platform 180 can be a thin film of air or some other fluid so the translation of carriage assembly 140 across platform 180 is smooth and requires minimal force from a linear actuator (described below and under the control of the computing device 300) to effect a translation. Importantly, as shown in FIG. 5, by proper positioning of carriage assembly 140 above base assembly 148, test probe 172 is positioned directly above test surface 156, and reference probes 174A, 174B, and 174C are positioned directly above reference surface 150. Furthermore the elevation of test probe 172 is such that test surface 156 is within the measurement range of test probe 172 and that the reference surface 150 is within the measurement range (in the Z-direction) of each of the reference probes 174A, 174B, and 174C.

Platform 180 is that object on which all key assemblies of the surface metrology system 50 are attached or rest upon. As seen in FIG. 5, base assembly 148 is coupled to and affixed to upper platform surface 168 such that base assembly 148 does not move relative to platform 180 during the measurement operation. Platform 180 generally has significant size and mass, in this example at least 0.02 cubic meter in volume and 50 kg in mass, such that it has a long thermal time constant (i.e., platform 180 expands or shrinks very slowly with changes in ambient temperature) and can absorb or at least dampen vibrations originating in the ambient environment and prevent them from influencing measurements of test surface 156. Platform 180 can be made from low-CTE materials such as invar, Zerodur®, or ULE®, or from a high-density material such as granite. In this example, this low coefficient of thermal expansion is less than 1.5e−6 mm/mm/degC (which captures all low-CTE materials including invar) and advantageously less than 0.1e−6 mm/mm/degC (which applies to ULE® and Zerodur®). The thickness (i.e., the Z-dimension) of platform 180 can be between 50 mm and 1 meter. Although flatness variations of upper platform surface 168 will be referenced out as described later, the peak-to-valley un-flatness of upper platform surface 168 can be less than 0.1 mm, and ideally less than 0.010 mm. Upper platform surface 168 can be polished with minimal texture to facilitate the smooth and low-friction translation of bearings 182A and 182B across platform 168 while test surface 156 is being measured.

It should be noted that base structure 158 can be unattached to platform 180, or base structure 158 can be attached to platform 180, or base structure 158 and platform 180 can be combined into a unitary object, or base structure 158 can even be eliminated. If base structure 158 is attached to platform 180, it can be attached mechanically or bonded with an adhesive, advantageously in this example with the attachment occurring at the center of base structure 158. If base structure 158 is eliminated, then Kelvin clamps 160A, 160B, and 160C must be mounted onto upper platform surface 168. Furthermore, if in another example base structure 158 is eliminated then the material of platform 180 can be the same as the material of reference object 152 to minimize any mechanical performance discrepancies between the two objects which can cause the test object 154 to undesirably shift in position relative to carriage assembly 140.

Figure 6:
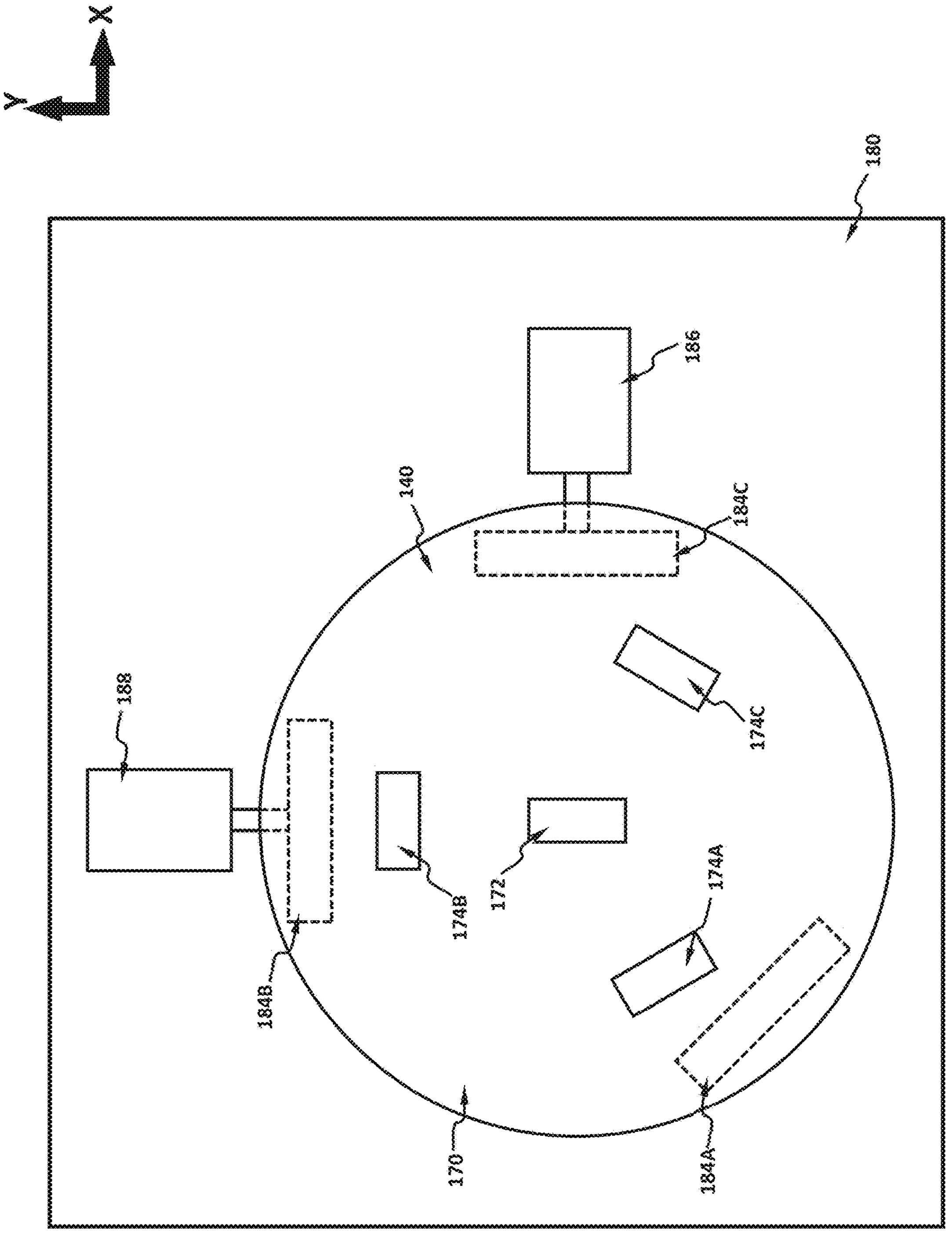
FIG. 6 is a plan view illustration of the surface metrology system with X and Y translation stages in accordance with examples of this technology.

FIG. 6 is a plan view of carriage assembly 140 above platform 180. In this example, base assembly 148—which is hidden behind carriage assembly 140 in this view—is not shown for clarity although the hidden components of carriage assembly are illustrated. Also illustrated in FIG. 6 are X-translation actuator 186 and Y-translation actuator 188. X-translation actuator 186 is rigidly mounted onto platform 180 and is coupled to a carriage leg 184C, such that when activated in this example by the computing device 300, such as with one or more carriage positions commands, X-translation actuator 186 causes carriage assembly 140 to translate substantially in the plus-or-minus X-direction, although other coupling and mounting configurations of X-translation actuator 186 are possible as well. Similarly, Y-translation actuator 188 is rigidly mounted onto platform 180 and is coupled to a carriage leg 184B, such that when activated in this example by the computing device 300, such as with one or more carriage positions commands, Y-translation actuator 188 causes carriage assembly 140 to translate substantially in the plus-or-minus Y-direction, although other coupling and mounting configurations of Y-translation actuator 188 are possible as well. In this way carriage assembly 140 can be made to translate in position in the X and Y directions with respect to base assembly 148, particularly during the process of measuring the topography of test surface 156. X-translation actuator 186 and Y-translation actuator 188 can for example operate by way of electrical motor-driven lead-screws, or by way of piezoelectric actuation, or even hydraulically or pneumatically actuated. Additionally, in this example, the range of travel of X-translation actuator 186 and Y-translation actuator can be between 1 mm and 1 meter, and can have motion resolution of between 1 nm and 0.1 mm.

Figure 7:
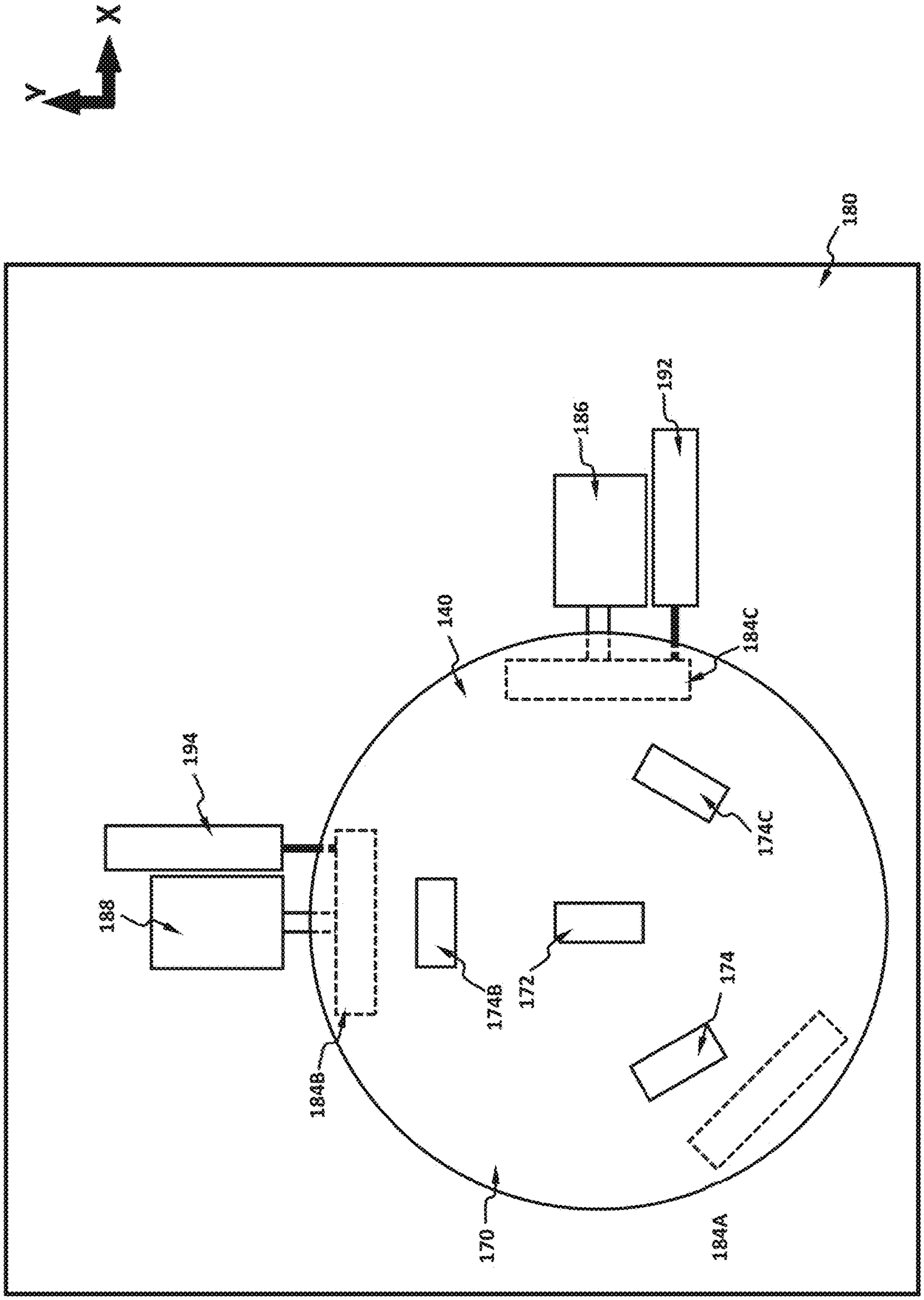
FIG. 7 is a plan view of the surface metrology system with position-measuring devices for determining the position of the carriage assembly.

FIG. 7 is a plan view of another example of carriage assembly 140 above platform 180 which is the same as the example shown in FIG. 6 in structure and operation, except as otherwise illustrated and described by way of the example herein. In this example, base assembly 148—which is hidden behind carriage assembly 140 in this view—is not shown for clarity although the hidden components of carriage assembly 140 are illustrated. Also illustrated in this example in FIG. 7 are Y-distance measuring device 194 and X-distance measuring device 192. X-distance measuring device 192 is rigidly mounted onto platform 180 and is configured to measure a relative displacement to a carriage leg 184C so that the changes in position of carriage assembly 140 in the X-direction can be measured, although other mounting and measuring configurations of X-distance measuring device 192 are possible as well including those in which a distance to a carriage assembly object other than a leg is being measured. Y-distance measuring device 194 is rigidly mounted onto platform 180 and is configured to measure a relative displacement to a carriage leg 184B so that the changes in position of carriage assembly 140 in the Y-direction can be measured, although other mounting and measuring configurations of Y-distance measuring device 194 are possible as well including those in which a distance to a carriage assembly object other than a leg is being measured. Additional distance measuring devices can be added, so there are a total of for example three, four, five, six, etc. distance measuring devices that measure relative displacements between various locations on platform 180 and various locations on or associated with carriage assembly 140 so that angular changes of carriage assembly 140 with respect to platform 180 can be determined, and/or that changes in distances in the Z-direction of carriage assembly with respect to platform 180 can be determined. If for example at least three distance measuring devices are employed along with at least three reference probes 174A, 174B, and 174C, then the carriage assembly 140 and test probe 172 can be localized in space in all six degrees of freedom, i.e., in X, Y, and Z as well as the rotations about the X, Y, and Z axes.

X distance measuring device 192 can be integrated with its associated X-translation actuator 186, or X distance measuring device 192 can be separate from its associated X-translation actuator 186 in which case X distance measuring device 192 can be located above or below (i.e., in the Z direction) X-translation actuator 186 or X distance measuring device 192 can be located to the side of (i.e., in the Y direction) X-translation actuator 186. Similarly, Y distance measuring device 194 can be integrated with its associated Y-translation actuator 188, or Y distance measuring device 194 can be separate from its associated Y-translation actuator 188 in which case Y distance measuring device 194 can be located above or below (i.e., in the Z direction) Y-translation actuator 188 or Y distance measuring device 194 can be located to the side of (i.e., in the X direction) Y-translation actuator 188. The accuracy of an X or Y distance measuring device, 192 or 194 respectively, can be better than 1 micrometer, or advantageously in this example better than 100 nm, or ideally better than 1 nm. Additionally the measurement range of an X or Y distance measuring device, 192 or 194 respectively, must be greater than or equal to the clear aperture of test surface 156 so that the position of carriage assembly 140, and, more importantly, the relative position of test probe 172 in the X and Y directions above test surface 156 is known. X or Y distance measuring device, 192 or 194 respectively, can be operative with non-contact optical interferometric methods, can be operative with mechanical contact methods, and can determine absolute or relative distance measurements.

Figure 8:
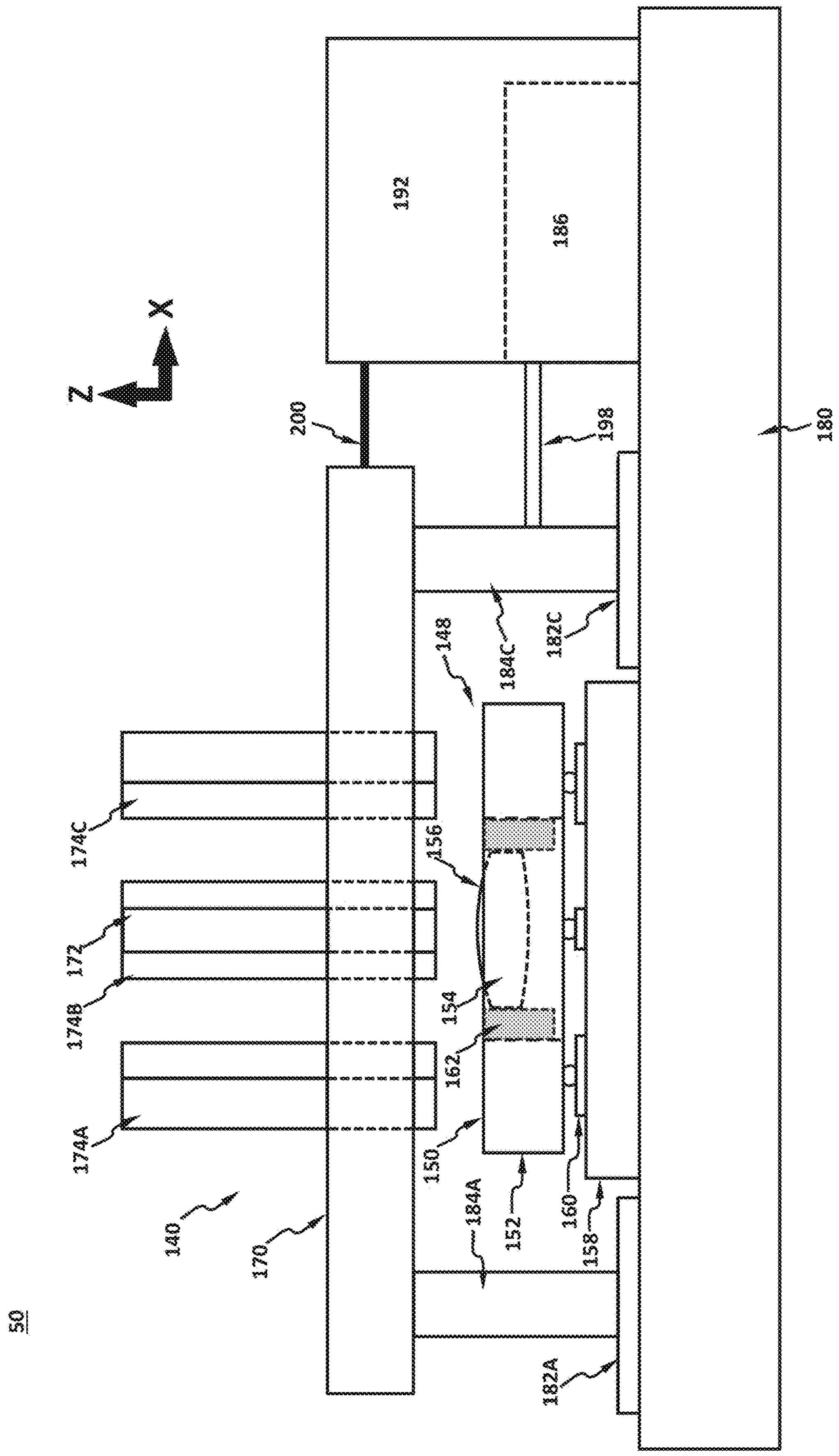
FIG. 8 is a side view of the surface metrology system with translation stages and position-measuring devices for determining the position of the carriage assembly.
Figure 9:
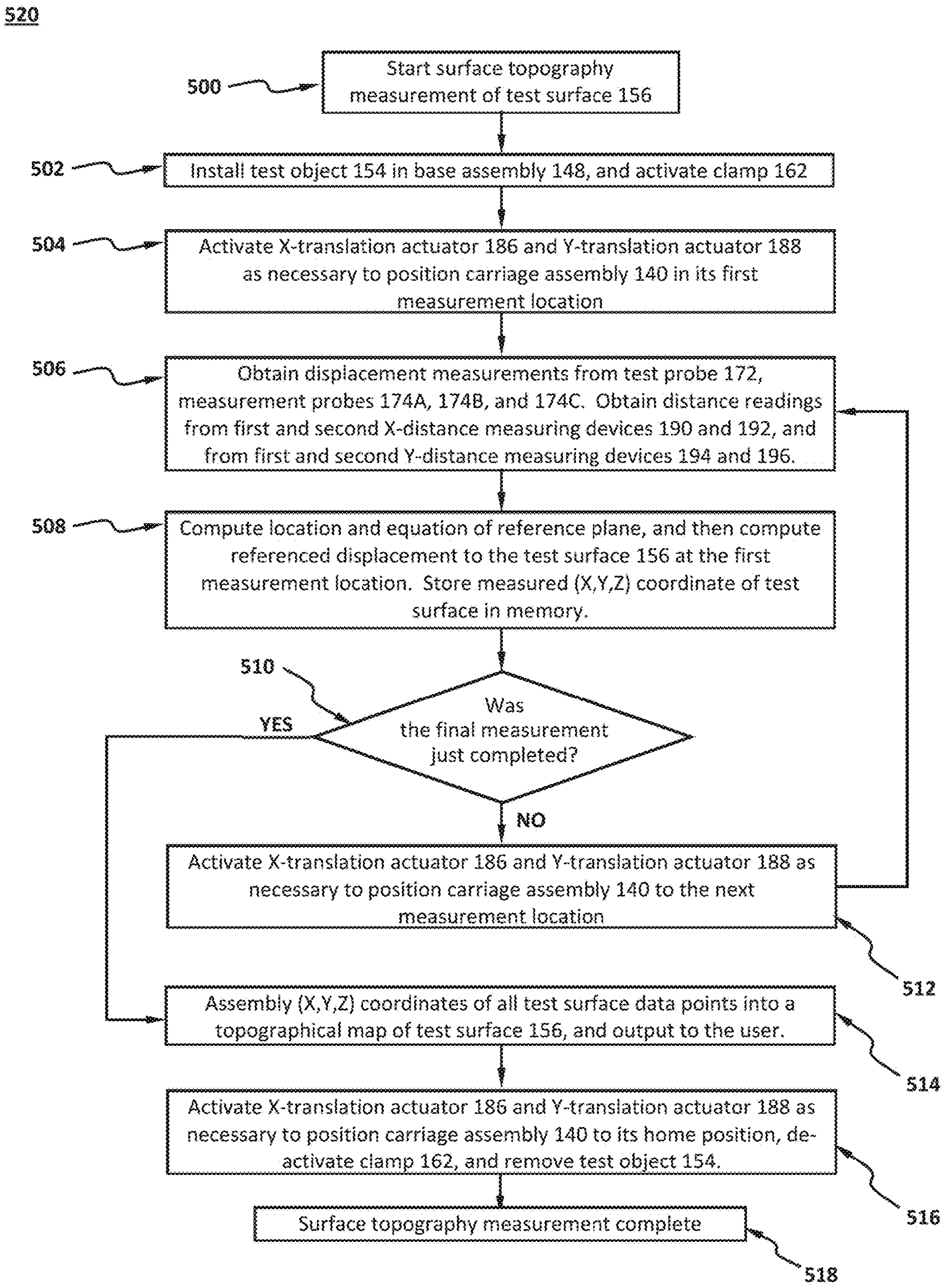
FIG. 9 is a flowchart illustrating the operation of the surface metrology system in accordance with examples of this technology.

FIG. 8 is an illustration of a side view of an example of the surface metrology system 50 shown and described with reference to FIG. 5 with additional components and elements. In FIG. 8 it is clearly shown in this example how X-translation actuator 186 is coupled to carriage leg 184C through X-translation effector 198 which can cause carriage assembly 140 to translate in the X-direction when X-translation actuator 186 is activated (similar accompanying mechanics for the Y-direction are not shown). Also in FIG. 8 it is clearly shown in this example how X distance measuring device 192 measures a distance to carriage stage 170 by way of measuring beam 200, such that the relative motion of carriage assembly 140 in the X direction can be measured as it moves under the control of X-translation actuator 186 through X-translation effector 198 (again, similar accompanying mechanics for the Y-direction are not shown), although other configurations of translations effectors and actuators and distance-measuring devices and beams are possible as well.

Figure 16:
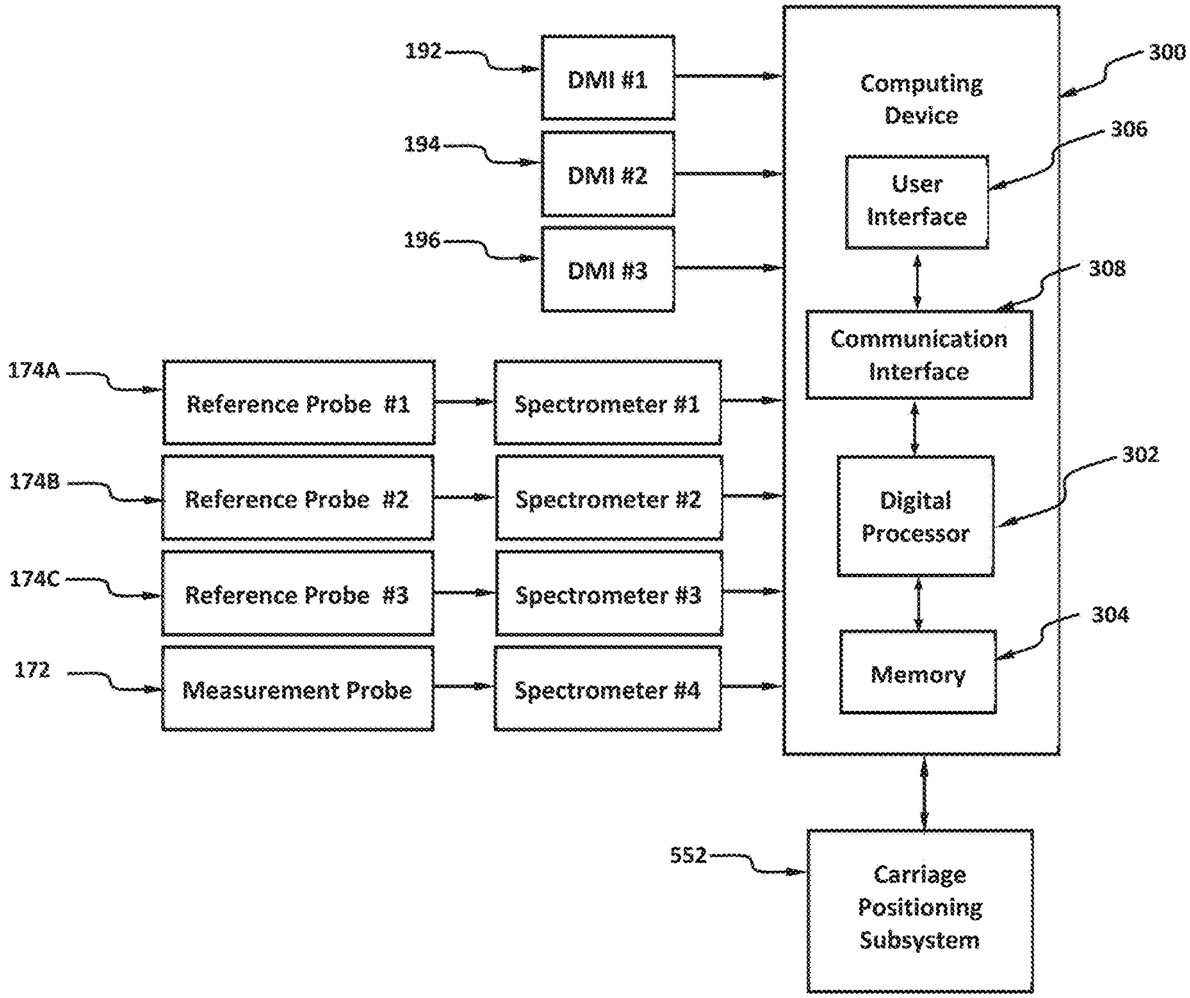
FIG. 16 is a block diagram of an example of a computing device and corresponding couplings in exemplary surface metrology system.

Surface metrology system 50 generally operates under the control of a program(s) executing on a computing device 300 which includes one or more processors 302, a memory 304, a user interface 306, and/or a communication interface 308, which are coupled together by a bus or other communication link, although the computing device can include other types and/or numbers of elements in other configurations. An example illustrating couplings between the computing device 300 and various parts of a surface metrology system 50 is shown in FIG. 16, although other types and/or numbers of connections with other components and/or other elements to enable any of the operations and/or other functions as illustrated and described by way of the examples herein may be used.

The processor(s) 302 of the computing device 300 may execute programmed instructions stored in the memory 304 of the computing device 300 for the any number of the functions identified above. The processor(s) 302 of the computing device 300 may include one or more CPUs or general purpose processors with one or more processing cores, for example, although other types of processor(s) can also be used.

The memory 304 of the computing device 300 stores these programmed instructions for one or more aspects of the present technology as described and illustrated by way of the examples herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 302, can be used for the memory 304.

Accordingly, the memory 304 of the computing device 300 can store one or more applications that can include computer executable instructions that, when executed by the computing device 300, cause the computing device 300 to perform one or more operations or other functions as illustrated and described by way of the examples herein.

The user interface 306 for the computing device 300, may for example be a keyboard and/or mouse, although other types of user interfaces may be used. The user interface 306 may also include a display device, such as a display screen or touchscreen for example.

The communication interface 38 of the computing device 300 operatively couples and communicates between the computing device 300 and other systems, devices, components and/or other elements as illustrated and described by way of the examples herein, although other types and/or numbers of communication networks or systems with other types and/or numbers of connections and/or configurations to other devices and/or elements can also be used.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

In this example, inputs to the programmed instructions may be for example from a user, the displacements from the test and reference probes (172, 174A, 174B, 174C), and information about the X and Y travel of carriage assembly 140 from X and Y displacement measuring devices (192 and 194, respectively), and outputs from the executed programmed instructions may include by way of example motion control commands to the X- and Y-translation actuators (186 and 188, respectively), clamp and un-clamp commands to test object clamp 162, and information about the surface topography of test surface 156, although the program and the computing device 300 it is executing on can have other numbers and types of inputs and outputs. When the programmed instructions are executed, the executed programmed instructions may for example include the processing steps illustrated in the exemplary flowchart 520 of FIG. 9, although other types and/or numbers of other processing steps in accordance with alternate flowcharts are possible as well.

In step 500 of exemplary flowchart 520 execution as commanded by a user through a user interface 306 in this example transmits an initiation command to the processor 302. Once program execution begins at step 500, execution proceeds immediately to step 502.

In step 502, one or more programmed instructions are executed by the processor 302 so that the carriage assembly 140 is moved to a side or removed from surface metrology system 50 so a user can access the base assembly 148, Additionally, one or more programmed instructions are executed by the processor 302 so the test object clamp 162 is commanded to the "unclamp" configuration whereupon the user may place the test object 154 in the base assembly 148 and then the test object clamp 162 is commanded to the "clamp" configuration. At this juncture, the test object 154 in this example is securely and immovably held in position with respect to the other components of base assembly 148, most notably the reference object 152.

After completion of step 502 execution proceeds to step 504 where one or more programmed instructions are executed by the processor 302 so the X and Y translation actuators 186 and 188, respectively, are activated and carriage assembly 140 translates in the X and Y directions as necessary such that test probe 172 is placed directly above, or nearly above, the center of the test surface 156. Knowledge of the center location of a test surface 156, or any test surface, can be known by an a priori calibration and measurement process, and the location of the carriage assembly 140, and more particularly the location of test probe 172, can be determined by the X and Y displacement data output from X distance measuring device 192 and Y distance measuring device 194 and subsequently input to the program at step 504. This central location on test surface 156 can be the location of the first displacement measurement on test surface 156, or instead the first measurement location can be at a physical edge of test surface 156, or at the clear aperture boundary of test surface 156, or anywhere on test surface 156, although for discussion and illustration purposes the center of test surface 156 will be the first surface measurement location.

Once the carriage assembly 140 is in the correct measurement position, execution proceeds to step 506 whereupon one or more programmed instructions are executed by the processor 302 so that the test probe 172 measures the displacement to test surface 156 and outputs the displacement information to the processor 302 and the displacement information is stored in memory 304. Also, reference probes 174A, 174B, and 174C are similarly engaged to measure the displacement to reference surface 150, and the reference displacement information is also transmitted to the processor 302 and stored in memory 304.

Next, at step 508, one or more programmed instructions are executed by the processor 302 to determine—from the reference probe displacement data—a measurement plane associated with test probe 172, and any differences from previous reference planes associated with previous displacement measurements at different locations of carriage assembly 140 are computed and the differences are removed from the displacement data generated from test probe 172 at the present location. These spurious differences in elevation from position to position of carriage assembly 140 can be caused by the un-flatness of upper platform surface 168, or other spurious influences such as dirt or particulates under a bearing 182A (or bearing 182B, etc.) which can cause carriage assembly 140 to tilt in an unpredictable manner. Capturing the reference displacement data—and subtracting any changes in the reference from the surface measurement—improves the accuracy of surface metrology system 50 by many orders of magnitude compared to un-referenced surface metrology systems of the prior art. The corrected displacement data to the test surface 156, which is substantially along the Z-axis, together with the X and Y location data from the X and Y distance measuring devices 192 and 194, respectively, are stored in memory 304 as an (X,Y,Z) coordinate point of test surface 156, and execution proceeds to step 510.

In step 510, one or more programmed instructions are executed by the processor 302 to determine whether the preceding (X,Y,Z) data point determined and saved in step 508 was the final data point of the topographical map of test surface 156. If it is not the final data point then the NO branch is taken to step 512; otherwise the YES branch is taken to step 514.

In step 512, one or more programmed instructions are executed by the processor 302 to activate the X and Y translation actuators 186 and 188, respectively, such that carriage assembly 140, and more particularly test probe 172, are translated in the X and Y direction and moved to the next measurement location. At this time, the X distance measuring device 192 and the Y distance measuring device 194 can provide feedback to the computing device 300 as to the location of carriage assembly 140 during the movement process, or at the end of the movement process. Furthermore X distance measuring device 192 and Y distance measuring device 194 can form a closed-loop feedback system, such as a PID (position-integral-differential) system well-known to those skilled in the art, such that carriage assembly 140 and test probe 172 are ultimately positioned very closely to the desired (commanded) position. Note that at a higher level, the pattern of sequential movements of test probe 172, in accordance with measurement data points of test surface 156, can form a serpentine path, a path comprising a series of concentric circles, a spiral path, or a series of linear paths forming a cross-hatch pattern, above test surface 156 so that a full aerial scan of test probe 172 over test surface 156 is accomplished wherein the density of data points in X-Y of test surface 156 are substantially uniform. The scan can be a continuous scan in which the velocity of the carriage assembly 140 is substantially constant during the entirety of the surface measurement process, or the motion of the carriage assembly 140 can comprise a sequence of starts and stops in which the carriage assembly is substantially stationary at the moment a surface measurement is made. The aerial scan can be made over a clear aperture of test surface 156, a portion of a clear aperture of test surface, or any other aerial scan including that area bordering the edge of test surface 156. Alternately, a simple "one-pass" sectional scan, such as with a single linear or circular scan, can be executed if an aerial scan is not necessary. In any event, after carriage assembly 140 and test probe 172 are in their next measurement position, execution proceeds back to step 506.

If the YES branch was from step 510, then execution proceeds to step 514. At this juncture all of the desired (X,Y,Z) data points of test surface 156 have been measured, collected, and stored in memory 304. In step 514, one or more programmed instructions are executed by the processor 302 so that the series of (X,Y,Z) data points are arranged into an array of data that comprise a topographical map of test surface 156, although other arrangements and configurations of the (X,Y,Z) data points are possible as well, such as an unstructured point cloud, or as data arranged in a cylindrical coordinate system, or even spherical, instead of Cartesian. After the topographical data of test surface 156 is in the desired format, it is output to the user in one or more ways, such as tabular or graphical formats.

After the topographical data of test surface 156 is output to the user in step 514, execution proceeds to step 516 wherein one or more programmed instructions are executed by the processor 302 so that the carriage assembly 140 is moved to a side or removed from surface metrology system 50 so the user can access the base assembly 148. The test object clamp 162 is commanded to the "unclamp" configuration whereupon the user removes the test object 154 from the base assembly 148. At this juncture execution in this example proceeds to step 518 where the surface topography measurement of test surface 156 is complete, and the processing of flowchart 520 terminates.

The above discussion in connection with FIGS. 3A through 10 concern a test object 154 having a test surface 156 whose peak-to-valley distance (or "sag") is less than the range over which test probe 172 can measure. For example, if test probe 172 can measure distances from 12 mm to 13 mm from the chromatic lens 110, then the measurement range of probe 172 is 13−12=1.0 mm. If the sag of test surface 156 is 1.5 mm, for example, then probe 172 will not be able to measure those areas of test surface 156 that fall outside the 1.0 mm measurement range and the topographic map of test surface 156 generated by surface metrology system 50 will be incomplete.

Figure 10:
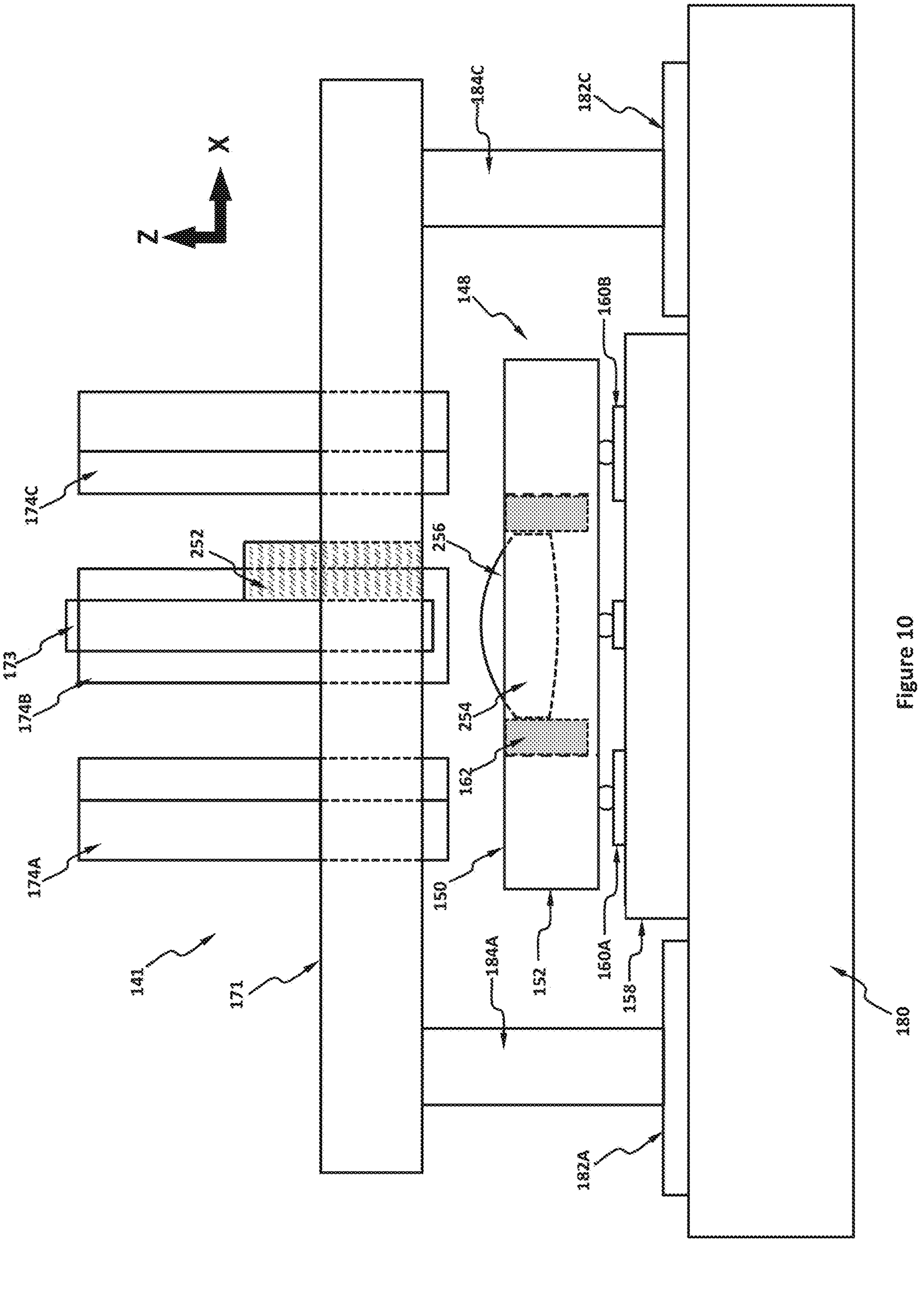
FIG. 10 is an illustration of the surface metrology system with a Z translation stage coupled to a test probe in accordance with examples of this technology.
Figure 11:
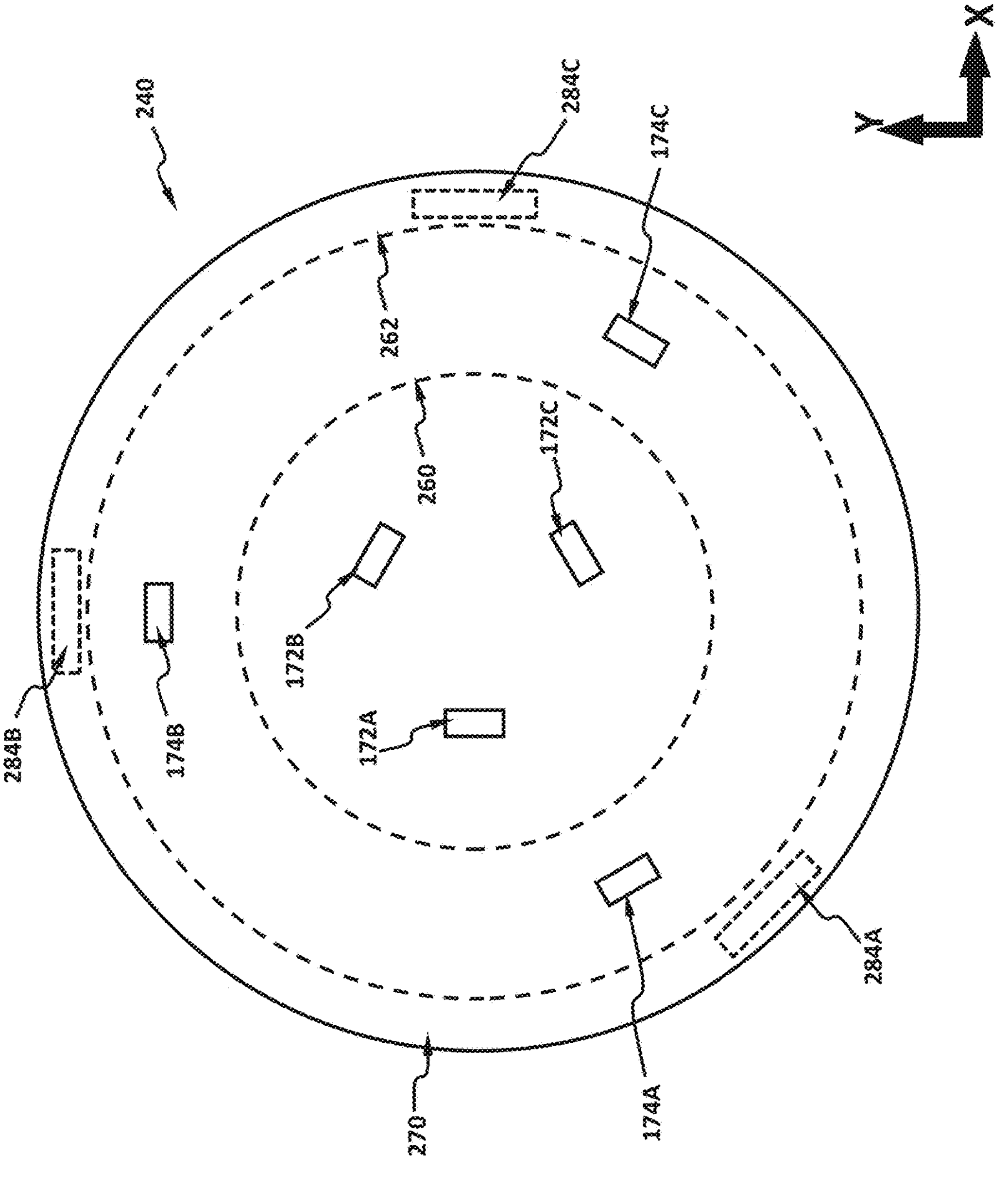
FIG. 11 is an illustration of the surface metrology system with multiple test probes in accordance with examples of this technology.

FIG. 10 is a side-view illustration of that case in which test object 154 has been replaced with test object 254 which has a highly curved test surface 256 whose sag would exceed the measurement range of test probe 172 shown in the example in FIG. 5. To accommodate the greater sag as shown in FIG. 10, a Z-translation stage 252 is included which provides the capability to move a test probe 173, such as exemplary probe 100 illustrated and described with reference to FIG. 2 by way of example, up and down in the Z-direction as needed in accordance with the topography of test surface 256 so that at no time does test surface 256 fall outside the measurement range of test probe 173. In this situation test probe 173 is coupled to Z-translation stage 252 and the Z-translation stage 252 in turn is coupled to a version of carriage stage 170 that has been modified to accept Z-translation stage 252 (namely exemplary carriage 171 now shown in FIG. 10). Note in this case that test probe 173 is not coupled directly to carriage 171 but through Z-translation stage 252. Z-translation stage 252 must maintain the parallelism of the optical axes test probe 173 and reference probes 174A, 174B, and 174C over the Z translation range of Z-translation stage 252. The translation range of Z-translation stage 252 can be greater than 1.0 mm, or even 10 mm, but advantageously in this example less than 1.0 meter. The precision of the motion of the Z translation of Z-translation stage 252 directly impacts the accuracy of the metrology of test surface 256, and ideally the precision of the Z-translation stage 252 is better than 10 nm, and advantageously in this example better than 1 nm. However, translation stage motion precision on these scales are often not obtainable, or obtainable at great cost, in which case a Z-distance measuring device (not shown) can be provided to determine the precise location in Z of test probe 173. In one exemplary embodiment the test probe 173 itself can serve as the Z-distance measuring device. For example, if it is determined that test probe 173 is approaching a measurement range boundary during the process of measuring the topography of test surface 256, then the X and Y translation of carriage assembly 141 can momentarily stop, the Z-translation stage 252 is activated causing test probe 173 to move (in Z) away from the measurement range boundary, after which test probe 173 procures another displacement measurement to test surface 256 from which the precise change in Z-position of test probe 173 is determined, then the X and Y translation of carriage assembly 141 can resume along with further displacement measurements of test surface 256 by test probe 173 in its new Z-position, and the change in the Z-position of test probe 173 made during the Z-translation is added to or otherwise accounted for when determining the displacement measurements of test surface 256 made after the Z-translation of test probe 173.

Another difficulty that can arise with surface metrology system 50 occurs when the test surface 156 becomes large. If test surface 156 has a 50 mm diameter, and the nominal X-Y spacing between surface data points is 10 μm, then test probe 172 will need to obtain $\pi 252/(0.01\times0.01)=19{,}635{,}000$ measurements, for example, which at a rate of 1000 measurements/second will require approximately 5.5 hours to complete. This rather long surface metrology duration is worsened if the test surface 156 has a diameter of 100 mm, in which case it will take nearly a whole day to measure the topography of test surface 156. To remedy this, additional test probes, such as the three-test-probe scenario depicted in FIG. 11 in which there are now three test probes, 172A, 172B, and 172C, situated above a larger test surface having test object perimeter 260. Each of the exemplary test probes 172A, 172B, and 172C is the same in structure and operation as the exemplary test probe 172 illustrated and described earlier. If the measurement areas of the three test probes 172A, 172B, and 172C are non-overlapping, which is generally not the case, then the duration of the measurement process is reduced by two-thirds, to approximately eight hours in the above example for a 100 mm diameter test surface (although it should be noted that the measurement duration can be greatly decreased by reducing the spatial X and/or Y distances between sample points). Note that Z-translation stages can be provided for each of the three test probes 172A, 172B, and 172C, as described above in connection with FIG. 10. Furthermore, depending on the size (i.e., the area) and shape of the test surface, more than three test probes can be outfitted to a carriage, such as four, six, ten, 16, 100, or more. In some configurations a test probe may "fall off" the edge of a test surface and then "fall onto" the reference surface during the course of measuring a test surface, in which case the test probe can continue to collect displacement data about the reference surface, and the reference measurement redundancy can improve the computational certainty of the reference plane associated with a given displacement measurement.

As mentioned above in connection to FIG. 11, additional test probes can reduce the time needed to measure the surface topography of a large test surface. One of the larger test objects needing nanometer-scale surface metrology precision is a telescope mirror, or at least a segment of a telescope mirror. As illustrated in the plan view of FIG. 12, a large telescope mirror segment 358 having segment perimeter 360 (the innermost dotted-line hexagon) surrounded by a large hexagonal reference object 364 having hexagonal reference perimeter 362, is below a hexagonal carriage 370 populated with an array of probes 350A through 350BM. In this example some 91 test probes are employed, several of which are located above the mirror segment 358 and others (at least three at all times) are located above the hexagonal reference object 364. In this way several partially overlapping surface sub-areas are topographically-measured in parallel to reduce the measurement duration, and each of these measurements are referenced as described above, and the resulting surface sub-areas are subsequently "stitched", or otherwise mathematically combined by the computing device 300, after the displacement data collection process is complete to yield a complete and highly-accurate topographical map of mirror segment 358.

One subtle benefit of utilizing an expansive array of probes to measure a large test object is the X and/or Y distance measuring devices 192 and/or 194 do not have to operate over a long measurement range. For example, if a width of a large test object is 1.5 meters, and there are ten probes across this width, then, given a nominal amount of sub-surface metrology overlap, the associated distance measuring device will need to operate over a measurement range of about 0.2 meters, which compares quite favorably with the full 1.5 meters of travel and distance measuring associated with a prior art metrology configuration presented and discussed in connection with FIG. 1. It is well-known in the art that reducing the measurement range of interferometric distance measuring devices greatly improves the accuracy and reduces the cost of the distance measuring device.

Figure 12:
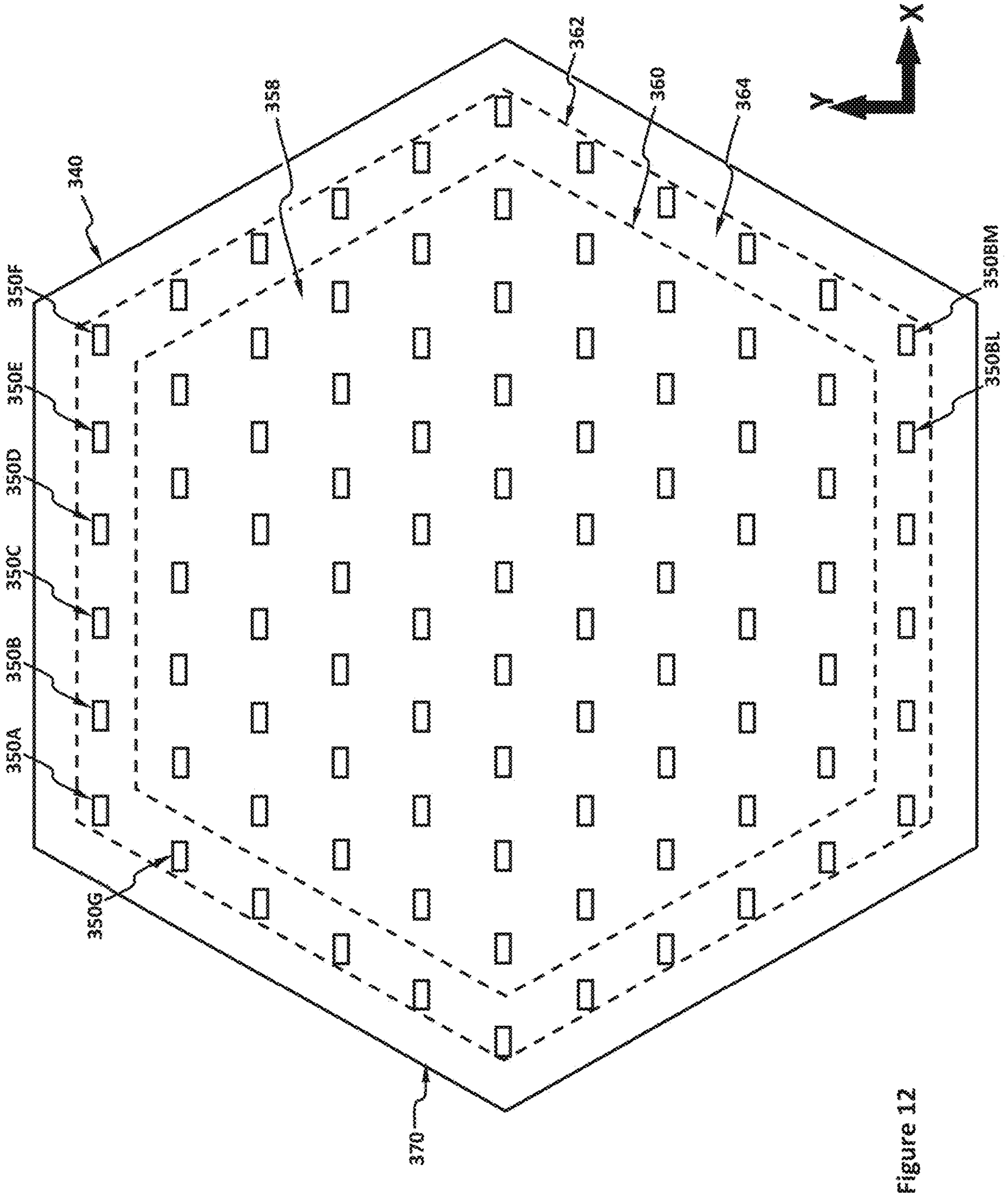
FIG. 12 is an illustration of the surface metrology system with multiple test probes measuring the surface topography of a telescope mirror segment in accordance with examples of this technology.

While the large test object 358 depicted in FIG. 12 has a hexagonal perimeter, it can instead have a circular or rectangular shape, arcuate, or any shape at all such as polygonal by way of example. In this example, a smallest width of large test object 358 can be from 50 mm to 10 meters, and the longest length of large test object 358 can be from 100 mm to 20 meters. The aspect ratio of a test object, defined as the longest length divided by a shortest width, can in this example be from 1000 down to 1.0. An example of a test object having a large aspect ratio is test object 454 appearing in FIG. 13, which can be a mirror or other optical element of an X-Ray synchrotron radiation source.

Figure 13:
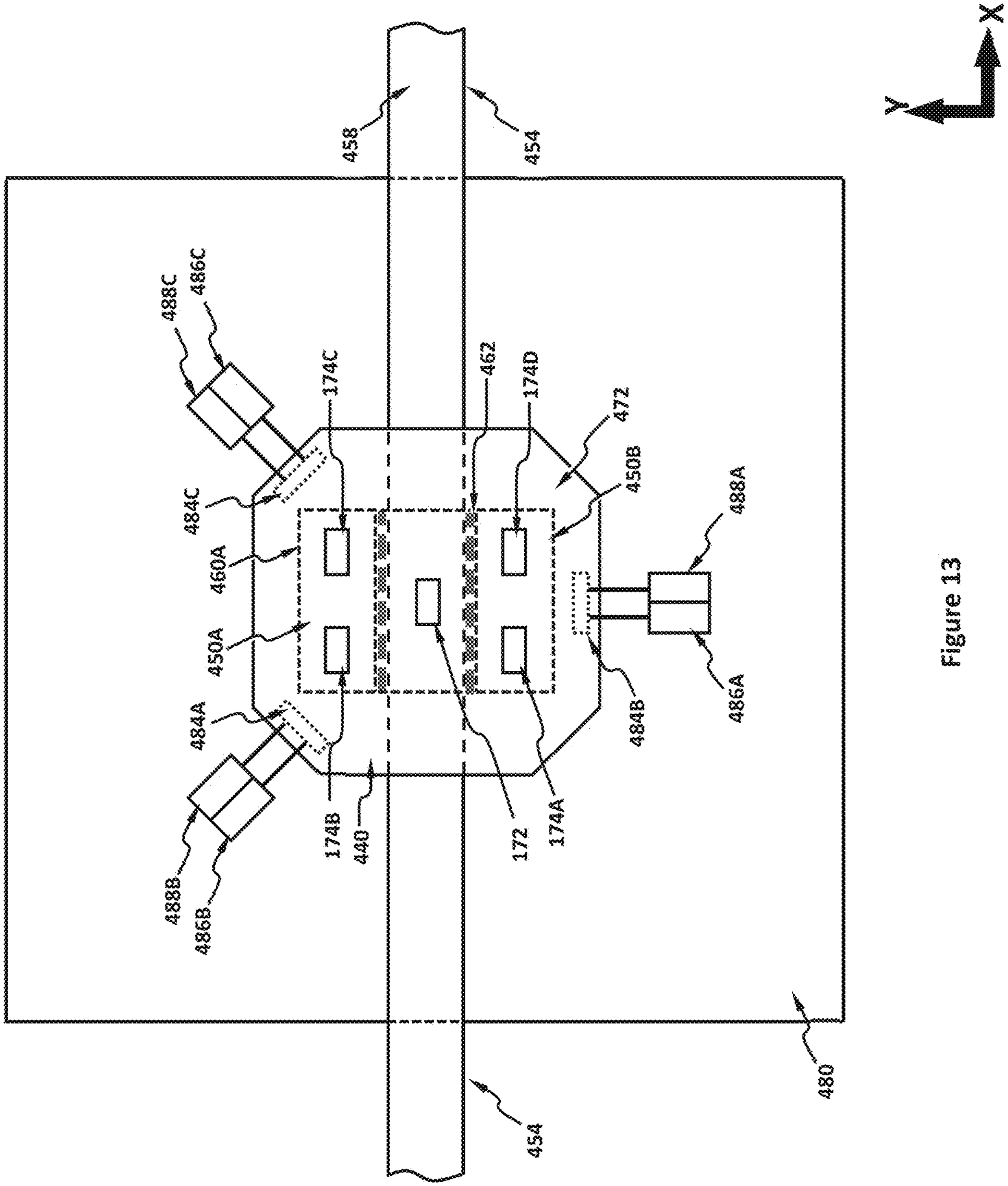
FIG. 13 is an illustration of the surface metrology system having one test probe for use in measuring the topography of a high aspect ratio surface in accordance with examples of this technology.

An embodiment of an alternate configuration of the claimed technology is illustrated in the plan view of FIG. 13. As seen in FIG. 13, a high aspect ratio test object 454, such as a mirror of an X-Ray synchrotron radiation source, is held in place with clamp 462 relative to a bifurcated reference object having a first reference surface 450A and second reference surface 450B which form a base assembly; note that first reference surface 450A can be substantially coplanar with second reference surface 450B. Base assembly in turn is mounted on a platform 480, along with three translation actuators 486A, 486B, and 486C, and three distance measuring devices 488A, 488B, and 488C, although other configurations and numbers of these components are possible as well. Located above the base assembly is carriage assembly 440 having a carriage 472 mounted onto and supported by three legs 484A, 484B, and 484C, wherein each leg supports carriage 472 and wherein one or more legs act cooperatively with a coupled translation actuator and/or distance measuring device. Also mounted onto carriage 472 are a test probe 172 located above test object 454, two reference probes 174A and 174D above second reference surface 450B, and two reference probes 174B and 174C above first reference surface 450A. In operation the carriage assembly 440 translates in the X and Y directions under the control of the translation actuators 486A, 486B, and 486C, and the localization determination of three distance measuring devices 488A, 488B, and 488C, while the displacement to the test object 454 is measured by test probe 172 and the displacements to the first and second reference surfaces 450A and 450B, respectively, are measured by reference probes 174B and 174C and reference probes 174A and 174D, respectively, so that a referenced measurement of the displacement to the test surface 458 of test object 454 can be made as described earlier.

Figure 14:
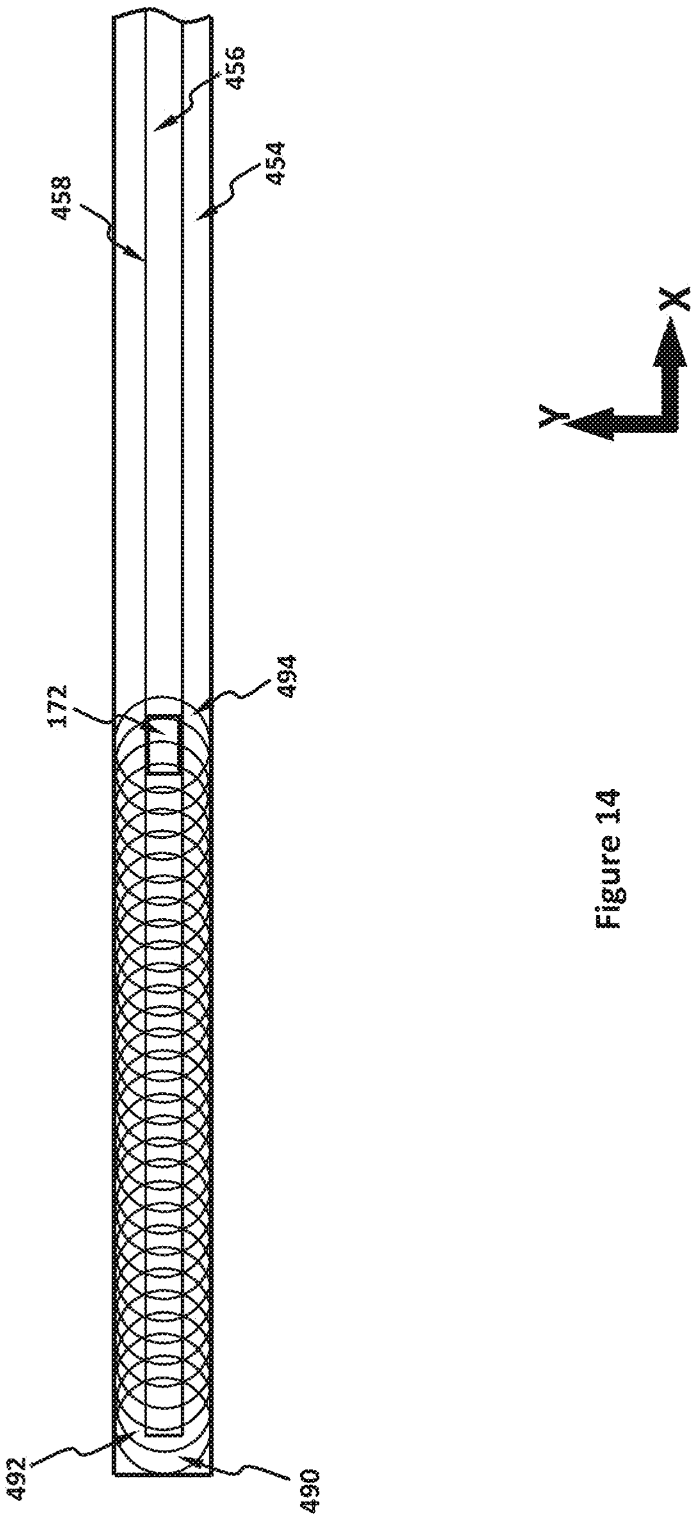
FIG. 14 is an illustrative plan view of the use of stitching in a surface metrology system having one test probe for use in measuring the topography of a high aspect ratio surface in accordance with examples of this technology.

Note that as depicted in FIG. 13, due to the limited travel range of carriage assembly 440 only a small portion of the test surface 458 of test object 454 can be topographically measured. To measure more of the test surface 458 of test object 454 the test object 454 can be unclamped, translated or otherwise moved in the X-direction, re-clamped, and then another sub-area, such as sub-area 494 as shown in FIG. 14, is topographically measured and then mathematically combined or stitched with the previous sub-area. Indeed, as shown in the plan view of FIG. 14, numerous sub-areas, or "sub-apertures", beginning with first measurement sub-area 490, followed by measuring second measurement sub-area 492, and continuing on to the current measurement sub-area 494, can be produced along the length of test object 454. Note that each measurement sub-area includes a substantial portion of the test surface 458 within clear aperture 456 of test object 454, and that each measurement sub-area overlaps a substantial amount with an adjacent sub-area. The overlapping of adjacent measurement sub-areas facilitates the mathematical stitching process, and the amount of overlap can be between 10% and 99% of the area of a measurement sub-area. Additionally, the sub-aperture topographical profiles generated by multiple probes, such as those shown in FIG. 12 for example, can also be stitched together to form a complete topographical map of the surface. Once all the measurement sub-areas are stitched together a complete topographical map of the test surface 458, within its clear aperture 456, of test object 454, will be determined.

Figure 15:
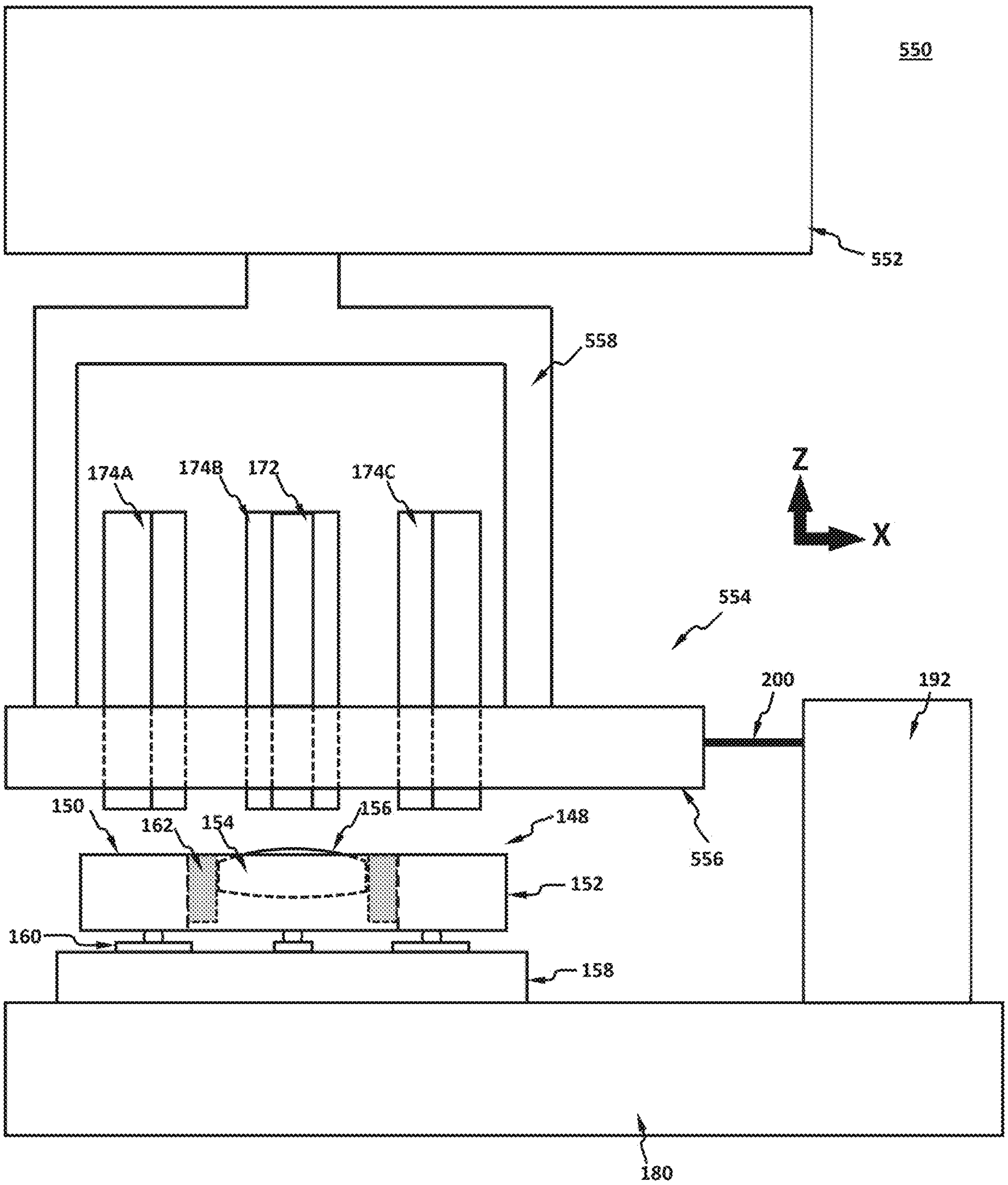
FIG. 15 is a side view of a surface metrology system with a positioning subsystem for moving the carriage assembly.

An embodiment of an alternate configuration of the claimed technology is illustrated in the side view diagram of surface metrology system 550 in FIG. 15. As seen in FIG. 15, one or more test probes 172 and none, one, or more reference probes 174 (or reference probes 174A, 174B, and 174C) are installed onto carriage 556. Carriage 556 in turn is mechanically coupled to coupler 558 which is further mechanically coupled to carriage positioning subsystem 552. Note the absence of translation stages in surface metrology system 550 which have been replaced with carriage positioning subsystem 552. Note also the absence of carriage legs 184A, 184B, etc., and bearings 182A, 182B, etc., although these could be retained which can eliminate the need for carriage positioning subsystem 552 to move or position the carriage assembly 554 in the Z-direction.

When activated, carriage positioning subsystem 552 causes the carriage 556, and any probes 172 and 174, to move with respect to the base assembly 148 in a manner as noted earlier in connection with FIGS. 5 through 9. In particular, when activated, carriage positioning subsystem 552 causes the carriage 556, and any probes 172 and 174, to move in the X and/or Y directions to effect a scanning process, as well as in the Z-direction so as to control the distance between the test probe 172 and test surface 156. Carriage positioning subsystem 552 can also include linear and angular metrology systems, that can either complement or replace X-distance measuring device 192 and Y-distance measuring device 194. Carriage positioning subsystem 552 can be embodied as a robot, a CMM (Coordinate Measuring Machine), a CNC (Computer Numerically Controlled) platform, or even as one or more linear translation stages with one or more rotation stages.

Heretofore the configuration of surface metrology system 50 comprised a carriage assembly that, during the course of measuring the topography of a test surface, freely translated across a stationary base assembly on which the test and reference surfaces were mounted. It should be noted that an alternate configuration of surface metrology system is also possible in which the carriage assembly is fixed in position and the base assembly on which the test and reference surfaces are mounted freely translate during the course of measuring the topography of a test surface.

Surface metrology systems 50 and 550 can be installed and operative in an environmentally controlled enclosure or room. The environment within the environmentally controlled enclosure or room can have its temperature controlled so that it is within a range of ±1° C., or more advantageously in this example ±0.1° C.; its relative humidity controlled to within a range of ±5%, or more advantageously in this example ±1%, and have slowly circulating air (or other gaseous mixture), moving at less than 10 mm/second in the vicinity of the probes 172 and/or 174; its air pressure is controlled so that the air pressure does not vary by more than ±1% or that pressure gradients, caused by flowing air or breezes induced by moving parts, do not exceed 3 Pascals/cm while measuring surface 156, so that changes in the ambient environmental conditions surrounding the probes 172 and/or 174 do not cause corresponding spurious changes in the accuracy or other performance metrics of the probes 172 and/or 174. Alternately, surface metrology systems 50 and 550 can be installed and operative in an environmentally controlled enclosure or room in which a large portion of the ambient air has been removed, such that, for example, the pressure is less than 10% of one atmosphere, or advantageously in this example less than 1% of one atmosphere. Alternately, surface metrology systems 50 and 550 can be installed and operative in an environmentally controlled enclosure or room in which a large portion of the ambient air has been replaced with another gas, such as Nitrogen for example, subject to the same environmental restrictions cited earlier in this paragraph.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data and/or information except as may be specified in the claims. Accordingly, the invention is limited only by the following claims and equivalents thereto.

What is claimed is:

1. A system for measuring the topography of a surface, the system comprising:

a carriage assembly comprising a plurality of displacement-measuring probes coupled to a carriage support structure; and a base assembly positioned adjacent to the carriage assembly, the base assembly comprising at least one reference object with an opening sized to receive a target object;

wherein at least one of the carriage assembly or the base assembly is configured to translate with respect to the other in at least two directions to enable at least one of the displacement-measuring probes to measure a displacement to a reference surface of the reference object and at least another one of the displacement-measuring probes to measure a displacement to a target surface of the target object whose topography is measured, wherein the base assembly and the reference object have thermal coefficient of expansion of less than 0.1 µm/m/° C. and wherein at least one of the displacement-measurement probes comprises an interferometric probe configured with a beam splitter to form reference and measurement arms and provided with at least one fiber optic through which interferometric light exits the probe; and a computing device coupled to the displacement-measuring probes, the computing device comprising memory comprising programmed instructions stored thereon and one or more processors configured to be capable of executing the stored programmed instructions to:

determine residual flatness errors of the reference surface from displacement data from the at least one of the displacement-measuring probes from prior measurements; and adjust displacement measurements to the target surface of the target object from the at least another one of the displacement-measuring probes based on the determined residual flatness errors.

2. The system as set forth in claim 1 wherein the carriage support structure of the carriage assembly further comprises:

a carriage stage coupled to each of the displacement-measuring probes; and two or more carriage legs coupled at one end to the carriage stage and at the other end to a carriage bearing.

3. The system as set forth in claim 1 further comprising:

a platform with a planar platform surface; and a base structure of the base assembly having one surface seated on the platform surface and having another surface with one or more attachment devices configured to secure the reference object.

4. The system as set forth in claim 1 further comprising:

a carriage translator coupled to translate the carriage assembly in the at least two directions in response one or more carriage position commands from a computing device.

5. The system as set forth in claim 1 further comprising:

a probe translation actuator coupled to translate the at least another one of the displacement-measuring probes in a direction substantially along a measurement axis in response one or more probe position commands from a computing device.

6. The system as set forth in claim 1 wherein the displacement-measuring probes each have a measurement axis and wherein each of the measurement axes are substantially parallel with each other.

7. The system as set forth in claim 1 wherein the at least one of the displacement-measuring probes to measure the displacement to the reference surface of the reference object further comprises at least three of the displacement-measuring probes to each measure a displacement to the reference surface of the reference object.

8. The system as set forth in claim 1 wherein the at least another one of the displacement-measuring probes to measure the displacement to the target surface of the target object whose topography is measured further comprises at least three of the displacement-measuring probes to each measure a displacement to the target surface of the target object.

9. A method for making a surface topography measurement system, the method comprising:

coupling a plurality of displacement-measuring probes to a carriage support structure to generate a carriage assembly; and positioning a base assembly adjacent to the carriage assembly, the base assembly comprising a reference object with an opening sized to receive a target object;

wherein at least one of the carriage assembly or the base assembly is configured to translate with respect to the other in at least two directions to enable at least one of the displacement-measuring probes to measure a displacement to a reference surface of the reference object and at least another one of the displacement-measuring probes to measure a displacement to a target surface of the target object whose topography is measured, wherein the base assembly and the reference object have thermal coefficient of expansion of less than 0.1 µm/m/° C. and wherein at least one of the displacement-measurement probes comprises an interferometric probe configured with a beam splitter to form reference and measurement arms and provided with at least one fiber optic through which interferometric light exits the probe; and providing a computing device coupled to the displacement-measuring probes, the computing device comprising memory comprising programmed instructions stored thereon and one or more processors configured to be capable of executing the stored programmed instructions to:

determine residual flatness errors of the reference surface from displacement data from the at least one of the displacement-measuring probes from prior measurements; and adjust displacement measurements to the target surface of the target object from the at least another one of the displacement-measuring probes based on the determined residual flatness errors.

10. The method as set forth in claim 9 wherein the coupling the plurality of displacement-measuring probes to a carriage support structure to generate the carriage assembly further comprises:

coupling a carriage stage to each of the displacement-measuring probes; and coupling two or more carriage legs at one end to the carriage stage and at the other end to a carriage bearing.

11. The method as set forth in claim 9 further comprising:

providing a platform with a planar platform surface; and seating one surface of a base structure of the base assembly on the platform surface and connecting one or more attachment devices configured to secure the reference object to another surface of the base structure.

12. The method as set forth in claim 9 further comprising:

coupling a carriage translator to translate the carriage assembly in the at least two directions in response one or more carriage position commands from a computing device.

13. The method as set forth in claim 9 further comprising:

coupling a probe translation actuator to translate the at least another one of the displacement-measuring probes in a direction substantially along a measurement axis in response one or more probe position commands from a computing device.

14. The method as set forth in claim 9 wherein the displacement-measuring probes each have a measurement axis and wherein each of the measurement axes are substantially parallel with each other.

15. The method as set forth in claim 9 wherein the coupling the plurality of displacement-measuring probes to the carriage support structure further comprises:

coupling three of the displacement-measuring probes to each measure a displacement to the reference surface of the reference object.

16. The method as set forth in claim 9 wherein the coupling the plurality of displacement-measuring probes to the carriage support structure further comprises:

coupling at least three of the displacement-measuring probes to the carriage support structure to each measure a displacement to the target surface of the target object.

* * * * *